(12) United States Patent
Chen et al.

(10) Patent No.: US 7,738,587 B2
(45) Date of Patent: Jun. 15, 2010

(54) METHOD AND APPARATUS FOR LAYERED MODULATION

(75) Inventors: Ernest C. Chen, San Pedro, CA (US); Joseph Santoru, Agoura Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1154 days.

(21) Appl. No.: 10/519,375

(22) PCT Filed: Jul. 3, 2003

(86) PCT No.: PCT/US03/20847
§ 371 (c)(1),
(2), (4) Date: Dec. 22, 2004

(87) PCT Pub. No.: WO2004/006455
PCT Pub. Date: Jan. 15, 2004

(65) Prior Publication Data
US 2006/0050805 A1 Mar. 9, 2006

Related U.S. Application Data

(60) Provisional application No. 60/393,437, filed on Jul. 3, 2002.

(51) Int. Cl.
*H04L 27/00* (2006.01)
(52) U.S. Cl. .................... 375/295; 375/308
(58) Field of Classification Search ............ 375/295, 375/296, 297, 298, 308, 279, 299
See application file for complete search history.

(56) References Cited

U.S. PATENT DOCUMENTS

| 3,076,180 A | 1/1963 | Havens et al. |
| 3,383,598 A | 5/1968 | Sanders |
| 3,878,468 A | 4/1975 | Falconer at al. |
| 3,879,664 A | 4/1975 | Monsen |

(Continued)

FOREIGN PATENT DOCUMENTS

CA 2442400 11/2002

(Continued)

OTHER PUBLICATIONS

Fang, T. et al.; "Fourth-Power Law Clock Recovery with Prefiltering", Proceedings of the International Conference on Communications (ICC), Geneva, May 23-26, 1993, New York, IEEE, US, vol. 3, May 23, 1993, pp. 811-815, XP010137089, ISBN:0-7803-0950-2, Section I, Introduction.

(Continued)

*Primary Examiner*—Emmanuel Bayard

(57) ABSTRACT

Improvements to a layered modulation (LM) implementation are disclosed. The present invention discloses two implementations of LM, using single and multiple transponders per signal frequency, respectively. Layered hierarchical 8PSK (H-8PSK) is a special case of LM. By re-encoding the high-priority (HP) portion of an H-8PSK signal, LM can improve carrier-to-noise ratio (CNR) of a H-8PSK signal. LM can be computer-simulated and a two-layered signal can be sequentially demodulated with a predicted CNR performance. An LM signal can be simulated using live signals for off-line processing. In addition, a signal processing apparatus can process in real time LM signals emulated from live satellite signals.

18 Claims, 36 Drawing Sheets

U.S. PATENT DOCUMENTS

| | | | |
|---|---|---|---|
| 3,974,449 A | 8/1976 | Falconer | |
| 4,039,961 A | 8/1977 | Ishio et al. | |
| 4,068,186 A | 1/1978 | Sato et al. | |
| 4,213,095 A | 7/1980 | Falconer | |
| 4,253,184 A | 2/1981 | Gitlin et al. | |
| 4,283,684 A | 8/1981 | Satoh | |
| 4,384,355 A | 5/1983 | Werner | |
| RE31,351 E | 8/1983 | Falconer | |
| 4,416,015 A | 11/1983 | Gitlin | |
| 4,422,175 A | 12/1983 | Bingham et al. | |
| 4,484,337 A | 11/1984 | Leclert et al. | |
| 4,500,984 A | 2/1985 | Shimbo et al. | |
| 4,519,084 A | 5/1985 | Langseth | |
| 4,594,725 A | 6/1986 | Desperben et al. | |
| 4,628,507 A | 12/1986 | Otani | |
| 4,637,017 A | 1/1987 | Assal et al. | |
| 4,647,873 A | 3/1987 | Beckner et al. | |
| 4,654,863 A | 3/1987 | Belfield et al. | |
| 4,670,789 A | 6/1987 | Plume | |
| 4,709,374 A | 11/1987 | Farrow | |
| 4,800,573 A | 1/1989 | Cupo | |
| 4,829,543 A | 5/1989 | Borth et al. | |
| 4,835,790 A | 5/1989 | Yoshida et al. | |
| 4,847,864 A | 7/1989 | Cupo | |
| 4,860,315 A | 8/1989 | Hosoda et al. | |
| 4,878,030 A | 10/1989 | Vincze | |
| 4,896,369 A | 1/1990 | Adams et al. | |
| 4,918,708 A | 4/1990 | Pottinger et al. | |
| 4,992,747 A | 2/1991 | Myers | |
| 4,993,047 A | 2/1991 | Moffatt et al. | |
| 5,043,734 A | 8/1991 | Niho | |
| 5,088,110 A | 2/1992 | Bonnerot et al. | |
| 5,111,155 A | 5/1992 | Keate et al. | |
| 5,121,414 A | 6/1992 | Levine et al. | |
| 5,199,047 A | 3/1993 | Koch | |
| 5,206,886 A | 4/1993 | Bingham | |
| 5,206,889 A | 4/1993 | Unkrich | |
| 5,221,908 A | 6/1993 | Katz et al. | |
| 5,229,765 A | 7/1993 | Gardner | |
| 5,233,632 A | 8/1993 | Baum et al. | |
| 5,237,292 A | 8/1993 | Chethik | |
| 5,285,474 A | 2/1994 | Chow et al. | |
| 5,285,480 A | 2/1994 | Chennakeshu et al. | |
| 5,317,599 A | 5/1994 | Obata | |
| 5,329,311 A | 7/1994 | Ward et al. | |
| 5,337,014 A | 8/1994 | Najle et al. | |
| 5,353,307 A | 10/1994 | Lester et al. | |
| 5,412,325 A | 5/1995 | Meyers | |
| 5,430,770 A | 7/1995 | Abbey | |
| 5,450,623 A | 9/1995 | Yokoyama et al. | |
| 5,467,197 A | 11/1995 | Hoff | |
| 5,471,508 A | 11/1995 | Koslov | |
| 5,493,307 A | 2/1996 | Tsujimoto | |
| 5,513,215 A | 4/1996 | Marchetto et al. | |
| 5,555,257 A | 9/1996 | Dent | |
| 5,577,067 A | 11/1996 | Zimmerman | |
| 5,577,087 A | 11/1996 | Furuya | |
| 5,579,344 A | 11/1996 | Namekata | |
| 5,581,229 A | 12/1996 | Hunt | |
| 5,592,481 A | 1/1997 | Wiedeman et al. | |
| 5,602,868 A | 2/1997 | Wilson | |
| 5,603,084 A | 2/1997 | Henry et al. | |
| 5,606,286 A | 2/1997 | Bains | |
| 5,608,331 A | 3/1997 | Newberg et al. | |
| 5,625,640 A | 4/1997 | Palmer et al. | |
| 5,642,358 A | 6/1997 | Dent | |
| 5,644,592 A | 7/1997 | Divsalar et al. | |
| 5,646,935 A | 7/1997 | Ishikawa et al. | |
| 5,648,955 A | 7/1997 | Jensen et al. | |
| 5,671,253 A | 9/1997 | Stewart | |
| 5,732,113 A | 3/1998 | Schmidl et al. | |
| 5,790,555 A * | 8/1998 | Narahashi et al. | 370/480 |
| 5,793,818 A | 8/1998 | Claydon et al. | |
| 5,799,010 A | 8/1998 | Lomp et al. | |
| 5,815,531 A | 9/1998 | Dent | |
| 5,819,157 A | 10/1998 | Ben-Efraim et al. | |
| 5,828,710 A | 10/1998 | Beale | |
| 5,848,060 A | 12/1998 | Dent | |
| 5,870,439 A | 2/1999 | Ben-Efraim et al. | |
| 5,870,443 A | 2/1999 | Rahnema | |
| 5,903,546 A | 5/1999 | Ikeda et al. | |
| 5,909,454 A | 6/1999 | Schmidt | |
| 5,937,004 A | 8/1999 | Fasulo et al. | |
| 5,940,025 A | 8/1999 | Koehnke et al. | |
| 5,940,750 A | 8/1999 | Wang | |
| 5,946,625 A | 8/1999 | Hassan et al. | |
| 5,952,834 A | 9/1999 | Buckley | |
| 5,956,373 A | 9/1999 | Goldston et al. | |
| 5,960,040 A | 9/1999 | Cai et al. | |
| 5,963,845 A | 10/1999 | Floury et al. | |
| 5,966,048 A | 10/1999 | Thompson | |
| 5,966,186 A | 10/1999 | Shigihara et al. | |
| 5,966,412 A | 10/1999 | Ramaswamy | |
| 5,970,098 A | 10/1999 | Herzberg | |
| 5,970,156 A | 10/1999 | Hummelgaard et al. | |
| 5,970,429 A | 10/1999 | Martin | |
| 5,978,652 A | 11/1999 | Burr et al. | |
| 5,987,068 A | 11/1999 | Cassia et al. | |
| 5,987,069 A | 11/1999 | Furukawa et al. | |
| 5,995,536 A * | 11/1999 | Arkhipkin et al. | 375/141 |
| 5,995,832 A | 11/1999 | Mallinckrodt | |
| 5,999,793 A | 12/1999 | Ben-Efraim et al. | |
| 6,002,713 A | 12/1999 | Goldstein et al. | |
| 6,008,692 A | 12/1999 | Escartin | |
| 6,018,556 A | 1/2000 | Janesch et al. | |
| 6,021,159 A | 2/2000 | Nakagawa | |
| 6,028,894 A | 2/2000 | Oishi et al. | |
| 6,032,026 A | 2/2000 | Seki et al. | |
| 6,034,952 A | 3/2000 | Dohi et al. | |
| 6,049,566 A | 4/2000 | Saunders et al. | |
| 6,052,586 A | 4/2000 | Karabinis | |
| 6,055,278 A | 4/2000 | Ho et al. | |
| 6,061,393 A | 5/2000 | Tsui et al. | |
| 6,072,841 A | 6/2000 | Rahnema | |
| 6,075,808 A | 6/2000 | Tsujimoto | |
| 6,078,645 A | 6/2000 | Cai et al. | |
| 6,084,919 A | 7/2000 | Kleider et al. | |
| 6,104,747 A | 8/2000 | Jalloul et al. | |
| 6,108,374 A | 8/2000 | Balachandran et al. | |
| 6,125,148 A | 9/2000 | Frodigh et al. | |
| 6,125,260 A | 9/2000 | Wiedeman et al. | |
| 6,128,357 A | 10/2000 | Lu et al. | |
| 6,131,013 A | 10/2000 | Bergstrom et al. | |
| 6,134,282 A | 10/2000 | Ben-Efraim et al. | |
| 6,140,809 A | 10/2000 | Doi | |
| 6,141,534 A | 10/2000 | Snell et al. | |
| 6,144,708 A | 11/2000 | Maruyama | |
| 6,166,601 A | 12/2000 | Shalom et al. | |
| 6,172,970 B1 * | 1/2001 | Ling et al. | 370/347 |
| 6,177,836 B1 | 1/2001 | Young et al. | |
| 6,178,158 B1 | 1/2001 | Suzuki et al. | |
| 6,188,717 B1 | 2/2001 | Kaiser et al. | |
| 6,192,088 B1 | 2/2001 | Aman et al. | |
| 6,212,360 B1 | 4/2001 | Fleming et al. | |
| 6,219,095 B1 | 4/2001 | Zhang et al. | |
| 6,246,717 B1 | 6/2001 | Chen et al. | |
| 6,249,180 B1 | 6/2001 | Maalej et al. | |
| 6,266,534 B1 | 7/2001 | Raith et al. | |
| 6,272,679 B1 | 8/2001 | Norin | |
| 6,275,678 B1 | 8/2001 | Bethscheider et al. | |
| 6,297,691 B1 | 10/2001 | Anderson et al. | |
| 6,304,594 B1 | 10/2001 | Salinger | |
| 6,307,435 B1 | 10/2001 | Nguyen et al. | |
| 6,313,885 B1 | 11/2001 | Patel et al. | |

| | | | | | | |
|---|---|---|---|---|---|---|
| 6,314,441 | B1 | 11/2001 | Raghunath | 2001/0024479 A1 | 9/2001 | Samarasooriya |
| 6,320,464 | B1 * | 11/2001 | Suzuki et al. ............... 330/151 | 2001/0055295 A1 | 12/2001 | Akiyama et al. |
| 6,320,919 | B1 | 11/2001 | Khayrallah et al. | 2002/0006795 A1 | 1/2002 | Norin et al. |
| 6,325,332 | B1 | 12/2001 | Cellier et al. | 2002/0009141 A1 | 1/2002 | Yamaguchi et al. |
| 6,330,336 | B1 | 12/2001 | Kasama | 2002/0010001 A1 | 1/2002 | Dahlman et al. |
| 6,333,924 | B1 | 12/2001 | Porcelli et al. | 2002/0051435 A1 | 5/2002 | Giallorenzi et al. |
| 6,335,951 | B1 * | 1/2002 | Cangiani et al. ............ 375/298 | 2002/0064173 A1 | 5/2002 | Watanabe |
| 6,366,309 | B1 | 4/2002 | Siegle | 2002/0067744 A1 | 6/2002 | Fujii et al. |
| 6,369,648 | B1 | 4/2002 | Kirkman | 2002/0071506 A1 | 6/2002 | Lindquist et al. |
| 6,377,116 | B1 | 4/2002 | Mattsson et al. | 2002/0082792 A1 * | 6/2002 | Bourde et al. ............... 702/107 |
| 6,389,002 | B1 | 5/2002 | Schilling | 2002/0126780 A1 | 9/2002 | Oshima et al. |
| 6,404,819 | B1 | 6/2002 | Gehlot | 2002/0136327 A1 | 9/2002 | El-Gamal et al. |
| 6,411,659 | B1 | 6/2002 | Liu et al. | 2002/0154705 A1 | 10/2002 | Walton et al. |
| 6,411,797 | B1 | 6/2002 | Estinto | 2002/0158619 A1 | 10/2002 | Chen |
| 6,426,822 | B1 | 7/2002 | Winter et al. | 2002/0172296 A1 * | 11/2002 | Pilcher ....................... 375/296 |
| 6,429,740 | B1 | 8/2002 | Nguyen et al. | 2002/0176516 A1 | 11/2002 | Jeske et al. |
| 6,433,835 | B1 | 8/2002 | Hartson et al. | 2002/0186761 A1 | 12/2002 | Corbaton et al. |
| 6,452,977 | B1 | 9/2002 | Goldston et al. | 2003/0002471 A1 | 1/2003 | Crawford et al. |
| 6,477,398 | B1 | 11/2002 | Mills | 2003/0043941 A1 | 3/2003 | Johnson et al. |
| 6,501,804 | B1 | 12/2002 | Rudolph et al. | 2003/0072385 A1 * | 4/2003 | Dragonetti ................... 375/295 |
| 6,515,713 | B1 | 2/2003 | Nam | 2003/0138037 A1 | 7/2003 | Kaku et al. |
| 6,522,683 | B1 | 2/2003 | Smee et al. | 2003/0138040 A1 | 7/2003 | Rouphael et al. |
| 6,529,715 | B1 * | 3/2003 | Kitko et al. .................. 455/103 | 2003/0147472 A1 * | 8/2003 | Bach et al. .................. 375/295 |
| 6,535,497 | B1 | 3/2003 | Raith | 2003/0171102 A1 | 9/2003 | Yang |
| 6,535,801 | B1 | 3/2003 | Geier et al. | 2003/0185310 A1 | 10/2003 | Ketchum et al. |
| 6,539,050 | B1 | 3/2003 | Lee et al. | 2003/0194022 A1 | 10/2003 | Hammons et al. |
| 6,556,639 | B1 | 4/2003 | Goldston et al. | 2004/0013084 A1 | 1/2004 | Thomas et al. |
| 6,574,235 | B1 | 6/2003 | Arslan et al. | 2004/0091059 A1 | 5/2004 | Chen |
| 6,577,353 | B1 * | 6/2003 | Welles et al. ................. 348/706 | 2004/0110467 A1 | 6/2004 | Wang |
| 6,597,750 | B1 | 7/2003 | Knutson et al. | 2004/0137863 A1 | 7/2004 | Walton et al. |
| 6,657,978 | B1 | 12/2003 | Millman | 2004/0146014 A1 | 7/2004 | Hammons et al. |
| 6,661,761 | B2 | 12/2003 | Hayami et al. | 2004/0146296 A1 | 7/2004 | Gerszberg et al. |
| 6,678,336 | B1 | 1/2004 | Katoh et al. | 2004/0196935 A1 | 10/2004 | Nieto |
| 6,700,442 | B2 * | 3/2004 | Ha .......................... 330/124 R | 2005/0008100 A1 | 1/2005 | Chen |
| 6,718,184 | B1 | 4/2004 | Aiken et al. | 2005/0037724 A1 | 2/2005 | Walley et al. |
| 6,721,300 | B1 | 4/2004 | Akiba et al. | 2006/0013333 A1 | 1/2006 | Chen |
| 6,731,622 | B1 | 5/2004 | Frank et al. | 2006/0022747 A1 | 2/2006 | Chen et al. |
| 6,731,698 | B1 | 5/2004 | Yoshie | 2006/0045191 A1 | 3/2006 | Vasanth et al. |
| 6,731,700 | B1 | 5/2004 | Yakhnich et al. | 2006/0056541 A1 | 3/2006 | Chen et al. |
| 6,741,662 | B1 | 5/2004 | Francos et al. | 2007/0011716 A1 | 1/2007 | Koslov et al. |
| 6,745,050 | B1 | 6/2004 | Forsythe et al. | 2007/0121718 A1 | 5/2007 | Wang et al. |
| 6,772,182 | B1 | 8/2004 | McDonald et al. | 2007/0297533 A1 | 12/2007 | Chitrapu et al. |
| 6,775,521 | B1 | 8/2004 | Chen | | | |
| 6,795,496 | B1 | 9/2004 | Soma et al. | | | |
| 6,803,814 | B1 | 10/2004 | Krupezevic et al. | | FOREIGN PATENT DOCUMENTS | |
| 6,809,587 | B2 | 10/2004 | Ghannouchi et al. | CA | 2502924 | 5/2004 |
| 6,891,897 | B1 | 5/2005 | Bevan et al. | DE | 3642213 | 12/1986 |
| 6,892,068 | B2 | 5/2005 | Karabinis et al. | EP | 0115218 | 8/1984 |
| 6,922,436 | B1 | 7/2005 | Porat et al. | EP | 0222076 | 8/1986 |
| 6,922,439 | B2 | 7/2005 | Yamaguchi et al. | EP | 0238822 | 9/1987 |
| 6,934,314 | B2 | 8/2005 | Harles et al. | EP | 0356096 | 2/1990 |
| 6,947,741 | B2 | 9/2005 | Beech et al. | EP | 0356096 A2 | 2/1990 |
| 6,956,841 | B1 | 10/2005 | Stahle et al. | EP | 0491668 A2 | 6/1992 |
| 6,956,924 | B2 | 10/2005 | Linsky et al. | EP | 0874474 A2 | 10/1998 |
| 6,970,496 | B1 | 11/2005 | Ben-Bassat et al. | EP | 0929164 | 7/1999 |
| 6,980,609 | B1 | 12/2005 | Ahn | EP | 1011245 | 6/2000 |
| 6,990,627 | B2 | 1/2006 | Uesugi et al. | EP | 1054537 A1 | 11/2000 |
| 6,999,510 | B2 | 2/2006 | Batruni | EP | 1065854 | 1/2001 |
| 7,041,406 | B2 | 5/2006 | Schuler et al. | EP | 1081903 A1 | 3/2001 |
| 7,054,384 | B1 * | 5/2006 | Ma et al. ..................... 375/299 | EP | 1335512 | 8/2003 |
| 7,073,116 | B1 | 7/2006 | Settle et al. | FR | 2696295 | 4/1994 |
| 7,079,585 | B1 | 7/2006 | Settle et al. | FR | 2724522 | 3/1996 |
| 7,154,958 | B2 | 12/2006 | Dabak et al. | JP | 2-5631 | 1/1990 |
| 7,161,931 | B1 | 1/2007 | Li et al. | JP | 2-95033 | 4/1990 |
| 7,173,981 | B1 | 2/2007 | Chen et al. | JP | 03139027 | 6/1991 |
| 7,184,473 | B2 | 2/2007 | Chen et al. | JP | 5-41683 | 2/1993 |
| 7,209,524 | B2 | 4/2007 | Chen | JP | 5-114878 | 5/1993 |
| 7,230,992 | B2 | 6/2007 | Walker et al. | JP | 5-252084 | 9/1993 |
| 7,239,876 | B2 | 7/2007 | Johnson et al. | JP | 07-038615 | 2/1995 |
| 7,251,291 | B1 * | 7/2007 | Dubuc et al. ............... 375/296 | JP | 2001069112 A | 3/2001 |
| 7,263,119 | B1 | 8/2007 | Hsu et al. | JP | 2001-244832 | 9/2001 |
| 2001/0012322 | A1 | 8/2001 | Nagaoka et al. | JP | 2002118611 | 4/2002 |
| 2001/0016926 | A1 | 8/2001 | Riggle | KR | 10-2001-0019997 | 3/2001 |

| | | |
|---|---|---|
| KR | 2001 0019997 | 3/2001 |
| TW | 318983 B | 11/1997 |
| TW | 362333 B | 6/1999 |
| TW | 391107 B | 5/2000 |
| TW | 435009 B | 5/2001 |
| TW | 451569 B | 8/2001 |
| TW | 462168 B | 11/2001 |
| TW | 499800 B | 8/2002 |
| TW | 502506 B | 9/2002 |
| WO | 9836467 | 8/1998 |
| WO | WO 99/00957 | 1/1999 |
| WO | WO 99/20001 | 4/1999 |
| WO | WO 99/23718 | 5/1999 |
| WO | 9933203 | 7/1999 |
| WO | 0079753 A1 | 12/2000 |
| WO | 0113532 A1 | 2/2001 |
| WO | WO 01/19013 | 3/2001 |
| WO | WO 01/39455 | 5/2001 |
| WO | WO 01/39456 | 5/2001 |
| WO | WO 02/073817 | 9/2002 |
| WO | WO 2005/074171 | 8/2005 |
| WO | WO 2005/086444 | 9/2005 |

OTHER PUBLICATIONS

Janssen, G.J.M; Slimane, S.B.: "Performance of a Multiuser Detector for M-PSK Signals Based on Successive Cancellation", ICC 2001, 2001 IEEE International Conference on Communications, Conference Record, Helsinky, Finland, Jun. 11-14, 2001, XP010552960.

Slimane, S.B.; Janssen, G.J.M.: "Power Optimization of M-PSK Cochannel Signals for a Narrowband Multiuser Detector", 2001 IEEE Pacific Rim Conference on Communications, Computer and Signal Processing, Victoria, B.C., Canada, Aug. 26-28, 2001, XP010560334.

Soong, A.C.K.; Krzymien, W.A.: "Performance of a Reference Symbol Assisted Multistage Successive Interference Cancelling Receiver in a Multicell CDMA Wireless System", Conference Record, Communication Theory Mini-Conference GlobeCom '95, IEEE Singapore Nov. 13-17, 1995, XP010159490.

Arslan, H; Molnar, K: "Iterative Co-channel Interference Cancellation in Narrowband Mobile Radio Systems", Emerging Technologies Symposium: Broadband, Wireless Internet Access, 2000 IEEE Apr. 10-11, 2000, Piscataway, New Jersey, US, XP010538900.

Mazzini, Gianluca: "Power Division Multiple Access", Universal Personal Communications, 1998, ICUPC 1998, IEEE 1998, International Conference on Florence, Italy, Oct. 5-9, 1998, New York, NY, US, IEEE, US Oct. 5, 1998, pp. 543-546, XP010314962 ISBN: 0-7803-5106-1.

Saleh, A.A.M. et al.: "Adaptive Linearization of Power Amplifiers in Digital Radio Systems", Bell System Technical Journal, American Telephone and Telegraph Co., New York, US, vol. 62, No. 4, Part 1, Apr. 1, 1983, pp. 1019-1033, XP002028354.

Ramchandran, Kannan et al.: Multiresolution Broadcast for Digital HDTV Using Joint Source/Channel Coding, IEEE, vol. 11, No. 1, Jan. 1993, pp. 6-22.

Meyr, Heinrich et al.; "Digital Communication Receivers—Synchronization, Channel Estimation, and Signal Processing"; John Wiley & Sons, Inc.; 1998; pp. 212-213 and 217-218; XP 002364874.

Meyr, Heinrich et al.; "Digital Communication Receivers—Synchronization, Channel Estimation, and Signal Processing"; John Wiley & Sons, Inc.; 1998; pp. 610-612; XP 002364876.

Wolcott, Ted J. et al.; "Uplink-Noise Limited Satellite Channels"; IEEE 1995; pp. 717-721; XP-00580915.

Seskar, Ivan et al.; "Implementation Aspects for Successive Interface Cancellation in DS/CDMA Systems"; Wireless Networks; 1998; pp. 447-452.

Earth Station Technology; 1986; pp. 404-412; XP-002248387.

Chen, Ernest et al.; "DVB-S2 Backward-Compatible Modes: A Bridge Between the Present and the Future"; International Journal of Satellite Communications and Networking; vol. 22, Issue 3, pp. 341-365; published 2004 by John Wiley & Sons, Ltd.

Palicot, J., Veillard, J.; "Possible Coding and Modulation Approaches to Improve Service Availability for Digital HDTV Satellite Broadcasting at 22 GHz"; IEEE Transactions on Consumer Electronics; vol. 39, Issue 3; Aug. 1993; pp. 660-667.

U.S. Appl. No. 10/693,135, filed Oct. 24, 2003, Chen, Notice of Allowance Date Jun. 20, 2007.

U.S. Appl. No. 10/532,632, filed Apr. 24, 2003, Chen et al., Notice of Allowance Date Jul. 29, 2007.

U.S. Appl. No. 10/692,491, filed Oct. 24, 2003, Ernest C. Chen, Date of Notice of Allowance Sep. 6, 2007

U.S. Appl. No. 11/603,776, filed Nov. 22, 2006, Chen et al., Date of Notice of Allowance Aug. 29, 2007.

Arslan, Huseyin and Molnar, Karl; "Co-channel Interference Cancellation with Successive Cancellation in Narrowband TDMA Systems"; Wireless Communications and Networking Conference; 2000 IEEE; Sep. 23-28, 2000; Piscataway, New Jersey, USA; vol. 3; pp. 1070-1074; XP010532692; ISBN: 0-7803-6596-8.

Non-final Communication dated Mar. 3, 2008 in U.S. Appl. No. 11/656,662, filed Jan. 22, 2007 by Ernest C. Chen et al.

Notice of Allowance dated Mar. 25, 2008 in U.S. Appl. No. 11/653,517, filed Jan. 16, 2007 by Ernest C. Chen.

EPO Communication dated Mar. 11, 2008 in European counterpart Application No. 03777694.5 of corresponding U.S. Appl. No. 10/532,509, filed Oct. 17, 2003 by Ernest Chen et al., now issued as U.S. Patent No. 7,230,480.

EPO Communication dated Mar. 7, 2008 in European counterpart Application No. 03742393.6 of corresponding U.S. Appl. No. 10/519,375, filed Jul. 3, 2003 by Ernest Chen et al.

Canadian Office Action dated Sep. 12, 2007 in Canadian counterpart Application No. 2491259 of corresponding U.S. Appl. No. 10/519,375, filed Jul. 3, 2003 by Ernest C. Chen et al.

Norwegian Office Action dated Nov. 15, 2007 in Norwegian counterpart Application No. 20026115 of corresponding U.S. Appl. No. 09/844,401, filed Apr. 27, 2001 by Ernet C. Chen, now Patent No. 7,209,524.

EPO Communication dated Aug. 3, 2007 in European counterpart application No. 03794510.2 of corresponding U.S. Appl. No. 10/236,414, filed Sep. 6, 2002 by Ernest C. Chen et al.

Non-final Office Communication dated Oct. 16, 2007 in U.S. Appl. No. 10/962,346, filed Oct. 8, 2004 by Ernest Chen.

Non-final Office Communication dated Apr. 1, 2008 in U.S. Appl. No. 10/961,579, filed Oct. 8, 2004 filed by Ernest C. Chen.

Notice of Allowance dated May 6, 2008 in U.S. Appl. No. 10/532,631, filed Apr. 25, 2005 by Paul R. Anderson et al.

Non-final Office Action dated Apr. 30, 2008 in U.S. Appl. No. 10/962,346, filed Oct. 8, 2004 by Ernest Chen.

Notice of Allowance dated Apr. 30, 2008 in U.S. Appl. 11/603,776, filed Nov. 22, 2006 by Ernest Chen et al.

EPO Communication dated Apr. 4, 2008 in European counterpart Application No. 03757359.9 corresponding to U.S. Appl. No. 10/165,710, filed Jun. 7, 2002 by Ernest Chen.

Notice of Allowance dated Mar. 12, 2008 in U.S. Appl. No. 11/655,001, filed Jan. 18, 2007 by Weizheng Wang et al.

Japanese Office Action dated Mar. 4, 2008 in Japanese counterpart Application No. 2004-297297 corresponding to U.S. Appl. No. 10/962,346, filed Oct. 8, 2004 by Ernest Chen.

EPO Communication dated Feb. 26, 2008 in European counterpart Application No. 04256234.8 corresponding to U.S. Appl. No. 10/962,346, filed Oct. 8, 2004 by Ernest Chen.

EPO Communication dated Feb. 7, 2008 in European counterpart Application No. 03742400.9 and received from European representative on Feb. 14, 2008 and corresponding to U.S. Appl. No. 10/519,322, filed Dec. 23, 2004 by Ernest Chen et al.

Notice of Allowance dated May 8, 2008 in U.S. Appl. No. 11/619,173 filed Jan. 2, 2007 by Ernest Chen et al.

Notice of Allowance dated May 6, 2008 in U.S. Appl. No. 10/532,632, filed Apr. 25, 2005 by Ernest Chen et al.

Notice of Allowance dated Apr. 21, 2008 in U.S. Appl. No. 10/519,322, filed Dec. 23, 2004 by Ernest Chen et al.

Canadian Office Action dated Nov. 29, 2007 in Canadian counterpart Application No. 2442400 corresponding to U.S. Appl. No. 09/844,401, filed Apr. 27, 2001 by Ernest Chen, now issued Apr. 27, 2007 as US Patent No. 7,209,524.

Combarel, L. and Lavan, E.; "HD-SAT (Race 2075): HDTV Broadcasting over KA-Band Satellite, Cable and MMDS"; International Broadcasting Convention; 1994; pp. 633-640; XP006505143.

EPO Communication dated May 6, 2008 in European counterpart Application No. 03774848.0 corresponding to U.S. Appl. No. 10/532,582, filed Apr. 25, 2005 by Ernest C. Chen et al., now issued Feb. 6, 2007 as US Patent No. 7,173,977.

EPO Communication dated May 6, 2008 in European counterpart Application No. 03777627.5 corresponding to U.S. Appl. No. 10/532,619, filed Apr. 25, 2005 by Ernest C. Chen.

Notice of Allowance dated May 22, 2008 in U.S. Appl. No. 10/532,619, filed Apr. 25, 2005 by Ernest C. Chen.

Notice of Allowance dated Jun. 2, 2008 in U.S. Appl. No. 10/691,032, filed Oct. 22, 2003 by Weizheng W. Wang et al.

Notice of Allowance dated Jun. 2, 2008 in U.S. Appl. No. 10/693,135, filed Oct. 24, 2003 by Ernest C. Chen.

Canadian Office Action dated Jan. 22, 2008 in Canadian counterpart Application No. 2487817 corresponding to U.S. Appl. No. 10/165,710, filed Jun. 7, 2002 by Ernest C. Chen.

Canadian Office Action dated Jan. 23, 2008 in Canadian counterpart Application No. 2484313 corresponding to U.S. Appl. No. 10/962,346, filed Oct. 8, 2004 by Ernest C. Chen.

Canadian Office Action dated Feb. 5, 2008 in Canadian counterpart Application No. 2503530 corresponding to U.S. Appl. No. 10/532,632, filed Apr. 25, 2005 by Ernest C. Chen et al.

Canadian Office Action dated Feb. 27, 2008 in Canadian counterpart Application No. 2515167 corresponding to U.S. Appl. No. 10/913,927, filed Aug. 5, 2004 by Ernest C. Chen.

Canadian Office Action dated Apr. 22, 2008 in Canadian counterpart Application No. 2502924 corresponding to U.S. Appl. No. 10/532,619, filed Apr. 25, 2005 by Ernest C. Chen.

Final Rejection dated Sep. 9, 2008 in U.S. Appl. No. 11/656,662, filed Jan. 22, 2007 by Ernest C. Chen et al.

Notice of Allowance dated Jun. 13, 2008 in U.S. Appl. No. 10/532,524, filed Apr. 25, 2005 by Ernest C. Chen et al.

Non-Final Office Action dated Jun. 17, 2008 in U.S. Appl. No. 10/913,927, filed Aug. 5, 2004 by Ernest C. Chen.

European Search Report and Search Opinion dated Jun. 13, 2008 in European counterpart Application No. 07075745.5 corresponding to U.S. Appl. No. 09/844,401, filed Apr. 27, 2001 by Ernest C. Chen, now issued Apr. 24, 2007 as US Patent No. 7,209,524.

El-Gamal, Abbas and Cover, Thomas M.; "Multiple User Information Theory"; Proceedings of IEEE; vol. 68, No. 12; Dec. 1980; pp. 1466-1483; XP007904837.

Scalart, Pascal; Leclerc, Michel; Fortier, Paul; Huynh Huu Tue; "Performance Analysis of a COFDM/FM In-band Digital Audio Broadcasting System"; IEEE Transactions on Broadcasting, IEEE Service Center; Piscataway, New Jersey, USA; vol. 43, No. 2; Jun. 1, 1997; pp. 191-198; XP011006070.

Arslan, Huseyin and Molnar, Karl; "Successive Cancellation of Adjacent Channel Signals in FDMA/TDMA Digital Mobile Radio Systems"; Vehicular Technology Conference; 48th IEEE VTC; Ottawa, Canada; May 18-21, 1998; New York, New York, USA; vol. 3; May 18, 1998; pp. 1720-1724; XP010288123.

EPO Summons to attend Oral Proceedings dated Jul. 18, 2008 in European counterpart Application No. 02728894.3 corresponding to U.S. Appl. No. 09/844,401, filed Apr. 27, 2001 by Ernest Chen, now issued Apr. 24, 2007 as US Patent No. 7,209,524.

Taiwanese Office Action dated May 14, 2008 in Taiwan counterpart Application No. 092129629 corresponding to U.S. Appl. No. 10/532,631, filed Apr. 25, 2005 by Paul R. Anderson et al.

Canadian Office Action dated Aug. 5, 2008 in Canadian couterpart Application No. 2503532 corresponding to U.S. Appl. No. 10/532,509, filed Oct. 17, 2003 by Ernest C. Chen et al., now issued Jun. 12, 2007 as US Patent No. 7,230,480.

Chinese Office Action dated Aug. 22, 2008 in Chinese Patent Application No. 200410100591.6 filed Oct. 10, 2004 by Ernest Chen.

Notice of Allowance dated Oct. 23, 2008 in U.S. Appl. No. 10/961,579, filed Oct. 8, 2004 by Ernest C. Chen.

Notice of Allowance dated Oct. 23, 2008 in U.S. Appl. No. 10/962,346, filed Oct. 8, 2004 by Ernest C. Chen.

EPO Communication dated Oct. 17, 2008 in European Patent Application No. 03774848.0 filed Oct. 15, 2003 by Ernest Chen et al.

EPO Communication dated Nov. 18, 2008 in European Patent Application No. 03742393.6 filed Jul. 3, 2003 by Ernest Chen et al.

Notice of Allowance dated Dec. 2, 2008 in U.S. Appl. No. 11/656,662, filed Jan. 22, 2007 by Ernest Chen et al.

Non-final Office Action dated Dec. 2, 2008 in U.S. Appl. No. 10/913,927, filed Aug. 5, 2004 by Ernest Chen.

EPO Communication dated Feb. 24, 2009 in European Patent Divisional Application No. 07075745.5 filed Apr. 24, 2002 (parent filing date) by Ernest C. Chen.

Canadian Office Action dated Oct. 3, 2008 in Canadian Patent Application No. 2491259 filed Jul. 3, 2003 by Ernest C. Chen et al.

Israel Office Action dated Feb. 15, 2009 in Israel Patent Application No. 164482 filed Oct. 10, 2004 by Ernest C. Chen.

Non-final Office Action dated Mar. 17, 2009 in U.S. Appl. No. 12/329,456, filed Dec. 5, 2008 by Ernest C. Chen et al.

Notice of Allowance dated Apr. 13, 2009 in U.S. Appl. No. 12/176,533, filed Jul. 21, 2008 by Ernest C. Chen et al.

Notice of Allowance dated Jul. 13, 2009 in U.S. Appl. No. 10/913,927, filed Aug. 5, 2004 by Ernest C. Chen.

ROC (Taiwan) Search Report dated Apr. 3, 2009 in ROC (Taiwan) Patent Application No. 092129498 filed Oct. 24, 2003 by Ernest C. Chen et al.

ROC (Taiwan) Search Report dated Apr. 3, 2009 in ROC (Taiwan) Patent Application No. 092117948 filed Jul. 1, 2003 by Ernest C. Chen et al.

ROC (Taiwan) Search Report completed May 30, 2009 in ROC (Taiwan) Patent Application No. 092129644 filed Oct. 24, 2003 by Ernest C. Chen, 1 page.

Scott, R. P. et al.; Ultralow Phase Noise Ti:sapphire Laser Rivals 100 MHz Crystal Oscillator; Nov. 11-15, 2001; IEEE-Leos; pp. 1-2.

Combarel, L. et al.; HD-SAT Modems for the Satellite Broadcasting in the 20 GHz Frequency Band; IEEE Transactions on Consumer Electronics; vol. 41, Issue 4; Nov. 1995; pp. 991-999.

U.S. Appl. No. 10/913,927, filed Aug. 5, 2004, Ernest C. Chen, Non-final Communication dated Dec. 11, 2007.

U.S. Appl. No. 11/619,173, filed Jan. 2, 2007, Ernest C. Chen, Non-final Communication dated Nov. 15, 2007.

U.S. Appl. No. 10/532,631, filed Apr. 25, 2005, Paul R. Anderson, Non-final Communication dated Nov. 19, 2007.

U.S. Appl. No. 10/691,032, filed Oct. 22, 2003, Weizheng Wang, Non-final Communication dated Nov. 16, 2007.

U.S. Appl. No. 10/519,322, filed Dec. 23, 2004, Ernest C. Chen, Notice of Allowance dated Dec. 11, 2007.

U.S. Appl. No. 10/532,619, filed Apr. 25, 2005, Ernest C. Chen, Notice of Allowance dted Dec. 26, 2007.

U.S. Appl. No. 11/603,776, filed Nov. 22, 2006, Ernest C. Chen, Notice of Allowance dated Jan. 2, 2008.

U.S. Appl. No. 10/692,539, filed Oct. 24, 2003, Ernest C. Chen, Non-final Communication dated May 31, 2007.

U.S. Appl. No. 10/692,539, filed Oct. 24, 2003, Ernest C. Chen, Notice of Allowance dated Sep. 20, 2007.

U.S. Appl. No. 10/532,632, filed Apr. 25, 2005, Ernest C. Chen, Notice of Allowance dated Jan. 7, 2008.

Canadian Office action dated Nov. 16, 2009 in Canadian Patent Application No. 2489569 filed Jul. 1, 2003 by Ernest C. Chen et al.

Canadian Office Action dated Sep. 17, 2009 in Canadian Patent Application No. 2503432 filed Oct. 20, 2003 by Paul R. Anderson et al.

EPO Summons to attent oral proceedings dated Sep. 16, 2009 in European Patent Application No. 03757359.9 filed Jun. 5, 2003 by Ernest C. Chen.

Reverse Decision on Appeal dated Aug. 19, 2009 in U.S. Appl. No. 10/236,414 filed Sep. 6, 2002 by Ernest C. Chen et al.

Notice of Allowance dated Sep. 4, 2009 in U.S. Appl. No. 12/329,456 filed Dec. 5, 2008 by Ernest C. Chen et al.

* cited by examiner

US 7,738,587 B2

METHOD AND APPARATUS FOR LAYERED MODULATION

CROSS REFERENCE TO RELATED APPLICATIONS

This application claims priority to the following U.S. Provisional Patent Application, which is incorporated by reference herein:

U.S. Provisional Patent Application Ser. No. 60/393,437, filed on Jul. 3, 2002, and entitled "LAYERED MODULATION SIMULATION RESULTS", by Ernest C. Chen et al.

This applications is related to the following patent applications, both of which applications are hereby incorporated by reference:

U.S. patent application Ser. No. 09/844,401, filed on Apr. 27, 2001, and entitled "LAYERED MODULATION FOR DIGITAL SIGNALS", by Ernest C. Chen issued on Apr. 24, 2007 as U.S. Pat. No. 7,209,524;

U.S. patent application Ser. No. 10/068,039, filed on Feb. 5, 2002, and entitled "PREPROCESSING SIGNAL LAYERS IN A LAYERED MODULATION DIGITAL SIGNAL SYSTEM TO USE LEGACY RECEIVERS", by Ernest C. Chen, et al. issued on Jul. 17, 2007 as U.S. Pat. No. 7,245,671;

U.S. patent application Ser. No. 10/068,047, filed on Feb. 5, 2002, and entitled "DUAL LAYER SIGNAL PROCESSING IN A LAYERED MODULATION DIGITAL SIGNAL SYSTEM", by Ernest C. Chen, et al. issued on Feb. 6, 2007 as U.S. Pat. No. 7,173,981; and International Application No. PCT/US03/020862, filed on Jul. 1, 2003, and entitled "IMPROVING HIERARCHICAL 8PSK PERFORMANCE", by Ernest C. Chen et al. published on Jan. 8, 2004 as Publication No. WO04004193.

BACKGROUND OF THE INVENTION

1. Field of the Invention

The present invention relates generally to systems and methods for transmitting and receiving digital signals, and in particular, to systems and methods for broadcasting and receiving digital signals using layered modulation techniques.

2. Description of the Related Art

Digital signal communication systems have been used in various fields, including digital TV signal transmission, either terrestrial or satellite.

As the various digital signal communication systems and services evolve, there is a burgeoning demand for increased data throughput and added services. However, it is more difficult to implement either improvement in old systems and new services when it is necessary to replace existing legacy hardware, such as transmitters and receivers. New systems and services are advantaged when they can utilize existing legacy hardware. In the realm of wireless communications, this principle is further highlighted by the limited availability of electromagnetic spectrum. Thus, it is not possible (or at least not practical) to merely transmit enhanced or additional data at a new frequency.

The conventional method of increasing spectral capacity is to move to a higher-order modulation, such as from quadrature phase shift keying (QPSK) to eight phase shift keying (8 PSK) or sixteen quadrature amplitude modulation (16 QAM). Unfortunately, QPSK receivers cannot demodulate conventional 8 PSK or 16 QAM signals. As a result, legacy customers with QPSK receivers must upgrade their receivers in order to continue to receive any signals transmitted with an 8 PSK or 16 QAM modulation.

Layered modulation techniques have been identified and developed to increase capacity, both in backwards compatible and non-backwards compatible implementations. Hierarchical modulation, particularly hierarchical 8 PSK (H-8 PSK), is also a special type of layer modulation that has been developed directed to a backwards compatible layered modulation implementation.

What is needed are systems and methods that improve layered modulation implementation, including hierarchical modulation implementations. Further, there is need for systems and methods that simulate the performance of layered modulation systems. The present invention satisfies these and other needs.

SUMMARY OF THE INVENTION

Improvements to a layered modulation (LM) implementation are disclosed. The present invention relates to two implementations of LM, using single and multiple transponders per signal frequency, respectively. Layered hierarchical 8 PSK (H-8 PSK) is a special case of LM. By re-encoding the high-priority (HP) portion of an H-8 PSK signal, LM can improve carrier-to-noise ratio (CNR) of a H-8 PSK signal.

In addition, LM can be computer-simulated and a two-layered signal can be sequentially demodulated with a predicted CNR performance. An LM signal can be emulated using live signals for off-line processing. In addition, a signal processing apparatus can process in real time LM signals emulated from live satellite signals. Embodiments of the invention comprise systems and methods for simulating a layer-modulated signal, including a hierarchically modulated signal. Such systems and methods are useful in the development of layer modulated systems because they allow convenient testing of proposed implementations and adjustments to existing systems and provide performance indicators at low cost.

A typical method for simulating a layer modulated signal having a first modulation of an upper layer and a second modulation of a lower layer, comprises providing an upper layer signal comprising a first modulated bit stream, providing a lower layer signal comprising a second modulated bit stream, attenuating the lower layer signal and combining the upper layer signal and the attenuated lower layer signal to produce the composite layer modulated signal. The upper and lower layers can be separately modulated in a laboratory environment or received from distinct antennas.

A first exemplary layer modulated system simulator comprises a first modulator for modulating a bit stream of the upper layer to produce an upper layer signal, a noise generator for adding noise to the upper layer signal, a second modulator for modulating a bit stream of a lower layer to produce a lower layer signal, an attenuator for attenuating the lower layer signal and a combiner for combining the noise-added upper layer signal and the attenuated lower layer signal to produce the composite layer modulated signal. This embodiment of the invention can be used for emulating a composite layer modulated signal entirely within a laboratory.

A second exemplary layer modulated system simulator comprises a first antenna for receiving the upper layer signal from a first satellite transponder, a first amplifier for amplifying the received upper layer signal, a second antenna for receiving the lower layer signal from a second satellite transponder, a second amplifier for amplifying the received lower layer signal, an attenuator for attenuating the received lower layer signal and a combiner for combining the upper layer signal and the attenuated lower layer signal to produce the composite layer modulated signal. This embodiment of the invention can be used for emulating a composite layer modulated signal from existing satellite signals.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Layered and Hierarchical Modulation/Demodulation

Figure 1A:
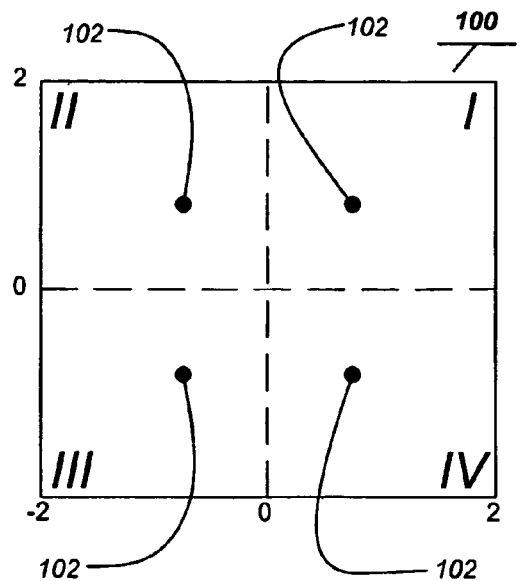
FIGS. 1A-1C illustrate the relationship of signal layers in a layered modulation transmission.
Figure 1B:
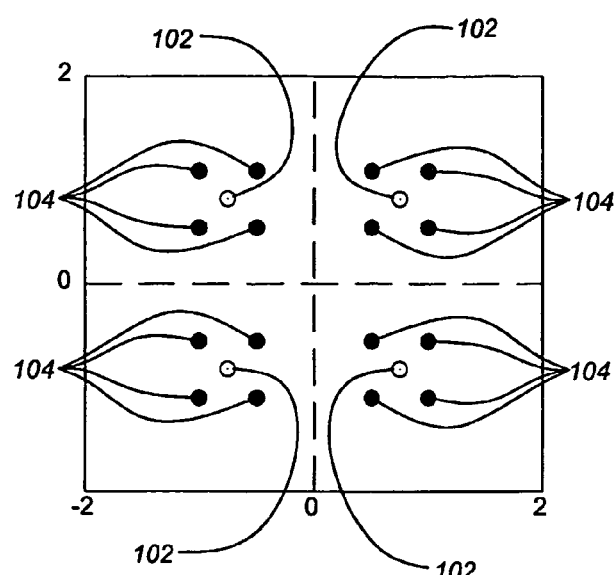
Figure 1C:
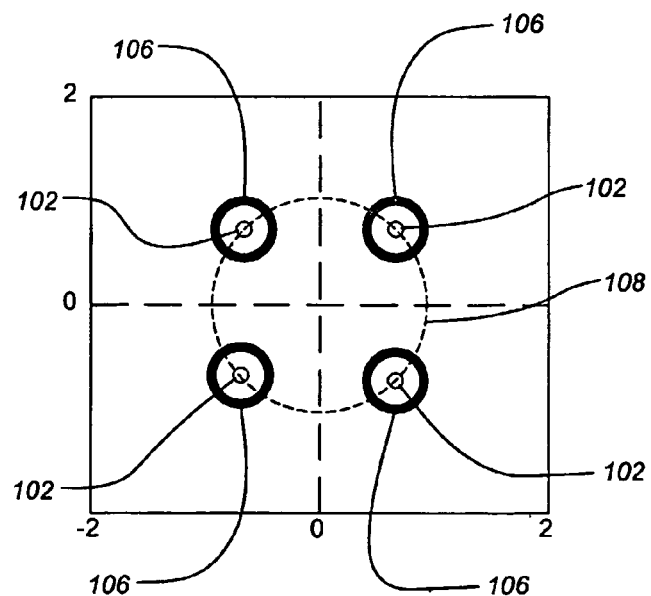

FIGS. 1A-1C illustrate the basic relationship of signal layers in a layered modulation transmission. FIG. 1A illustrates a first layer signal constellation 100 of a transmission signal showing the signal points or symbols 102. FIG. 1B illustrates the second layer signal constellation of symbols 104 over the first layer signal constellation 100 where the layers are coherent. FIG. 1C illustrates a second signal layer 106 of a second transmission layer over the first layer constellation where the layers may be non-coherent. The second layer 106 rotates about the first layer constellation 102 due to the relative modulating frequency of the two layers in a non-coherent transmission. Both the first and second layers rotate about the origin due to the first layer modulation frequency as described by path 108.

Figure 2A:
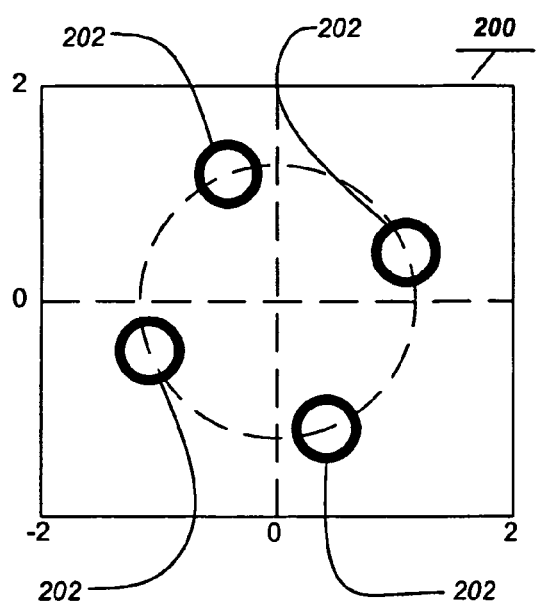
FIGS. 2A-2C illustrate a signal constellation, along with its phase characteristics, of a second transmission layer over a first transmission layer non-coherently.
Figure 2B:
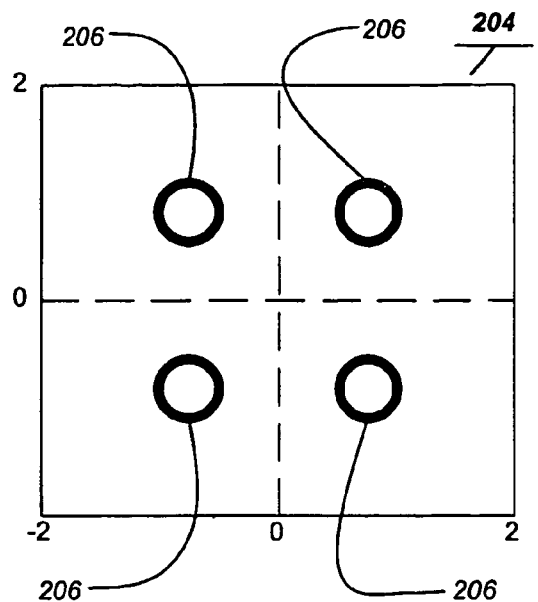
Figure 2C:
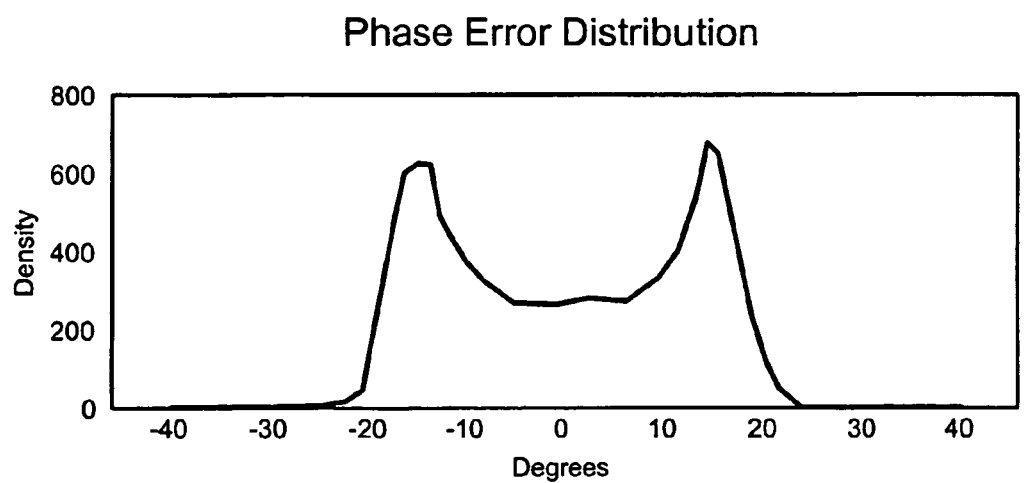

FIGS. 2A-2C illustrate a signal constellation of a second transmission layer over the first transmission layer after first layer demodulation. FIG. 2A shows the constellation 200 before the first carrier recovery loop (CRL) and FIG. 2B shows the constellation 200 after CRL. In this case, the signal points of the second layer are actually rings 202. FIG. 2C depicts a phase distribution of the received signal with respect to nodes 102. A relative modulating frequency causes the second layer constellation to rotate around the nodes of the first layer constellation. After the second layer CRL this rotation is eliminated. The radius of the second layer constellation is determined by its power level. The thickness of the rings 202 is determined by the carrier to noise ratio (CNR) of the second layer. As the two layers are non-coherent, the second layer may also be used to transmit analog or digital signals. A special case of layered modulation is found in hierarchical modulation, such as hierarchical non-uniform 8 PSK.

Figure 3A:
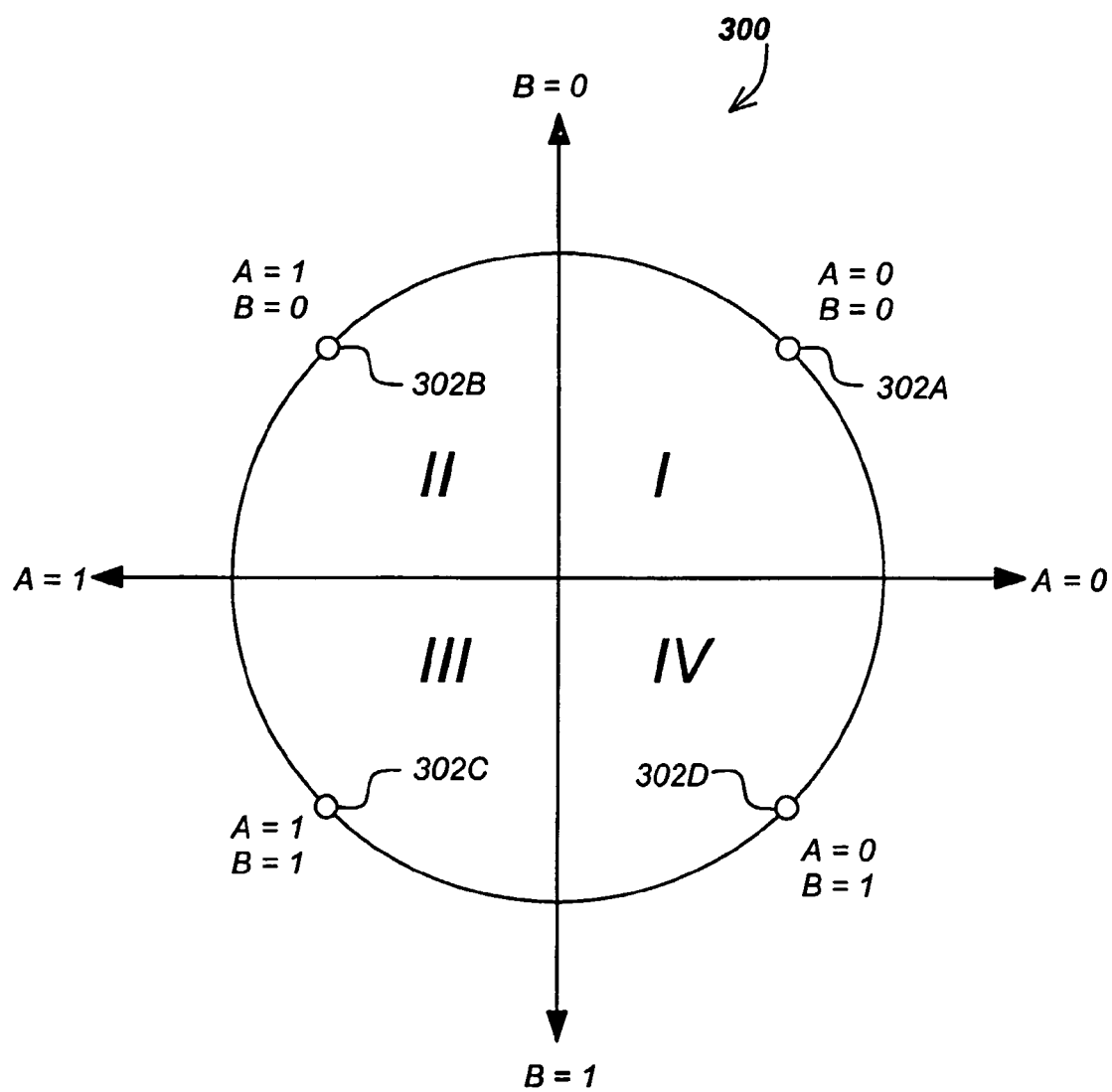
FIG. 3A is a diagram illustrating a QPSK signal constellation.

FIG. 3A is a diagram illustrating a signal constellation for a QPSK HP data signal. The signal constellation includes four possible signal outcomes 302 for A and B wherein {A,B}={0, 0} (point 302A in the first quadrant), {1,0} (point 302B in the second quadrant), {1,1} (point 302C in the third quadrant), and {0,1} (point 302D in the fourth quadrant). An incoming and demodulated signal mapped to one of quadrants (I-IV) and the value for {A,B} (and hence, the value for the relevant portion of the HP data stream) is determined therefrom.

Figure 3B:
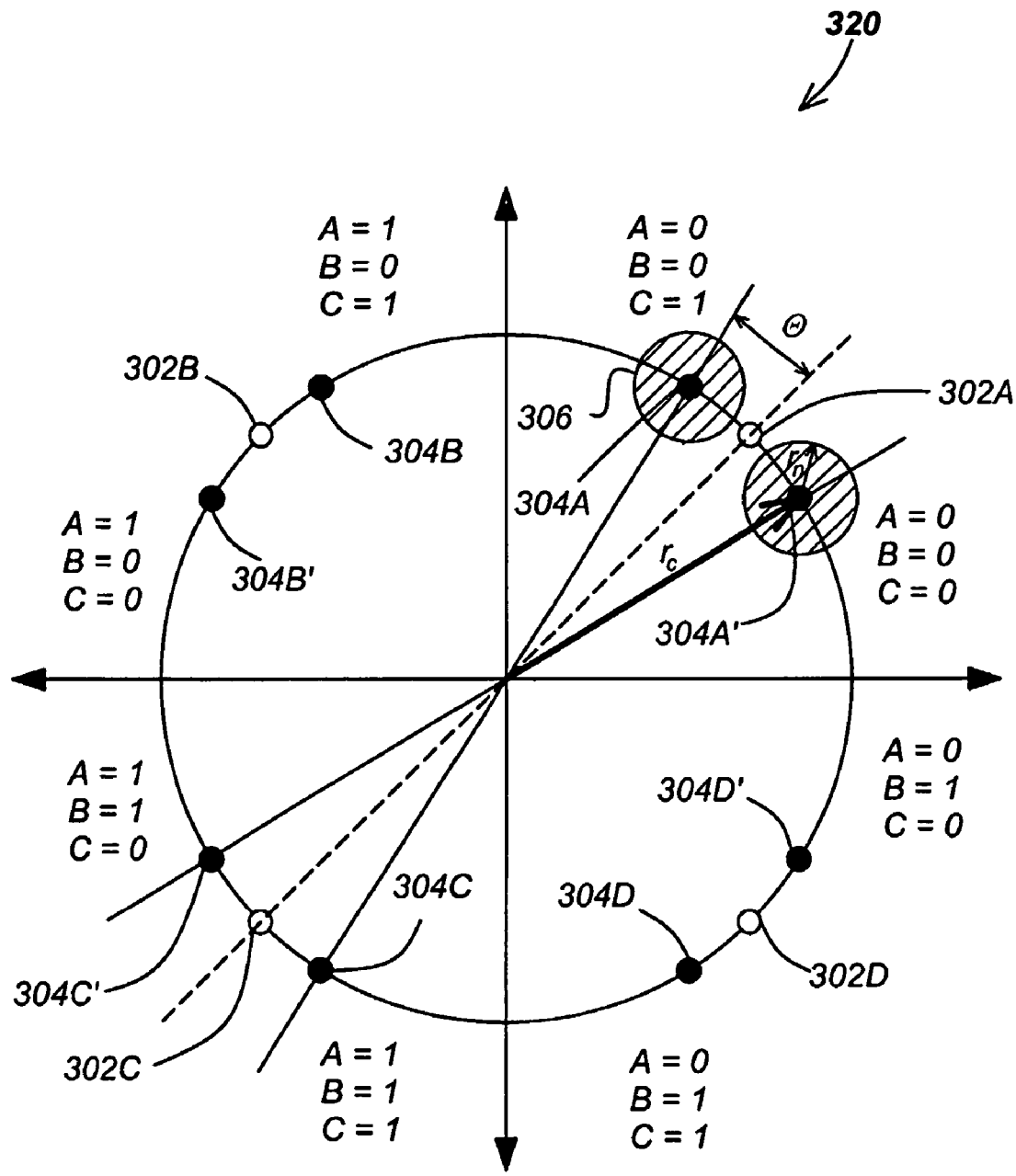
FIG. 3B is a diagram illustrating a non-uniform 8 PSK signal constellation achieved through layered modulation.

FIG. 3B is a diagram illustrating an 8 PSK constellation created by addition of an LP data stream (represented by "C"). The application of hierarchical modulation adds two possible data values for "C" (C={1,0}) to each of the outcomes 302A-302D. For example, outcome 302A ({A,B}={0, 0}) is expanded to an outcome pair 304A and 304A' ({A,B, C}={0,0,1} and {0,0,0}), respectively, with the members of the pair separated by an angle θ from {A,B}. This expands the signal constellation to include 8 nodes 104A-104D (each shown as solid dots).

If the angle θ is small enough, a legacy QPSK signal will receive both {A,B,C}={0,0,1} and {0,0,0} as {A,B}={0,0}. Only receivers capable of performing the second hierarchical level of modulation (LP) can extract the value for {C} as either {0} or {1}. This hierarchical signal structure has been termed "non-uniform" 8 PSK.

The choice of the variable θ depends on a variety of factors. FIG. 3B, for example, presents the idealized data points without noise. Noise and errors in the transmission and/or reception of the signal vary the actual position of the nodes 304A-304D and 304A'-304D' in FIG. 3B. Noise regions 306 surrounding each node indicate areas in the constellation where the measured data may actually reside. The ability of the receiver to detect the symbols and accurately represent them depends on the angle θ, the power of the signal (e.g. the carrier), represented by $r_c$, and the noise (which can be represented by $r_n$). As can be seen by inspecting FIG. 3B, interference of LP into HP is reduced as signal power increases, or as θ decreases. The performance of this hierarchical modulating system can be expressed in terms of its carrier to interference ratio (C/I).

With a layered-type demodulation as in this invention, the noise contributed by UL symbol errors to the extracted LL signal is avoided. With a Layered modulation mapping, the LP bit value for the 8 nodes alternates between 0 and 1 around the circle, i.e., {0,1,0,1,0,1,0,1}. This is in contrast with the {0,0,1,1,0,0,1,1} assignment in FIG. 3B for the conventional hierarchical modulation. Layered demodulation first FEC-decodes the upper layer symbols with a quasi-error free (QEF) performance, then uses the QEF symbols to extract the lower layer signal. Therefore, no errors are introduced by uncoded lower layer symbol errors. The delay memory required to obtain the QEF upper layer symbols for this application presents a small additional receiver cost, particularly in consideration of the ever-decreasing solid state memory cost over time.

In a conventional hierarchical receiver using non-uniform 8 PSK, the LP signal performance can be impacted by HP demodulator performance. The demodulator normally includes a timing and carrier recovery loop. In most conventional recovery loops, a decision-directed feedback loop is included. Uncoded symbol decisions are used in the prediction of the tracking error at each symbol time of the recovery loop. The tracking loop would pick up an error vector whenever a symbol decision is in error; the uncoded symbol error rate (SER) could be as high as 6% in many legacy systems. An FEC-corrected demodulator of this invention avoids the degradation.

Figure 4A:
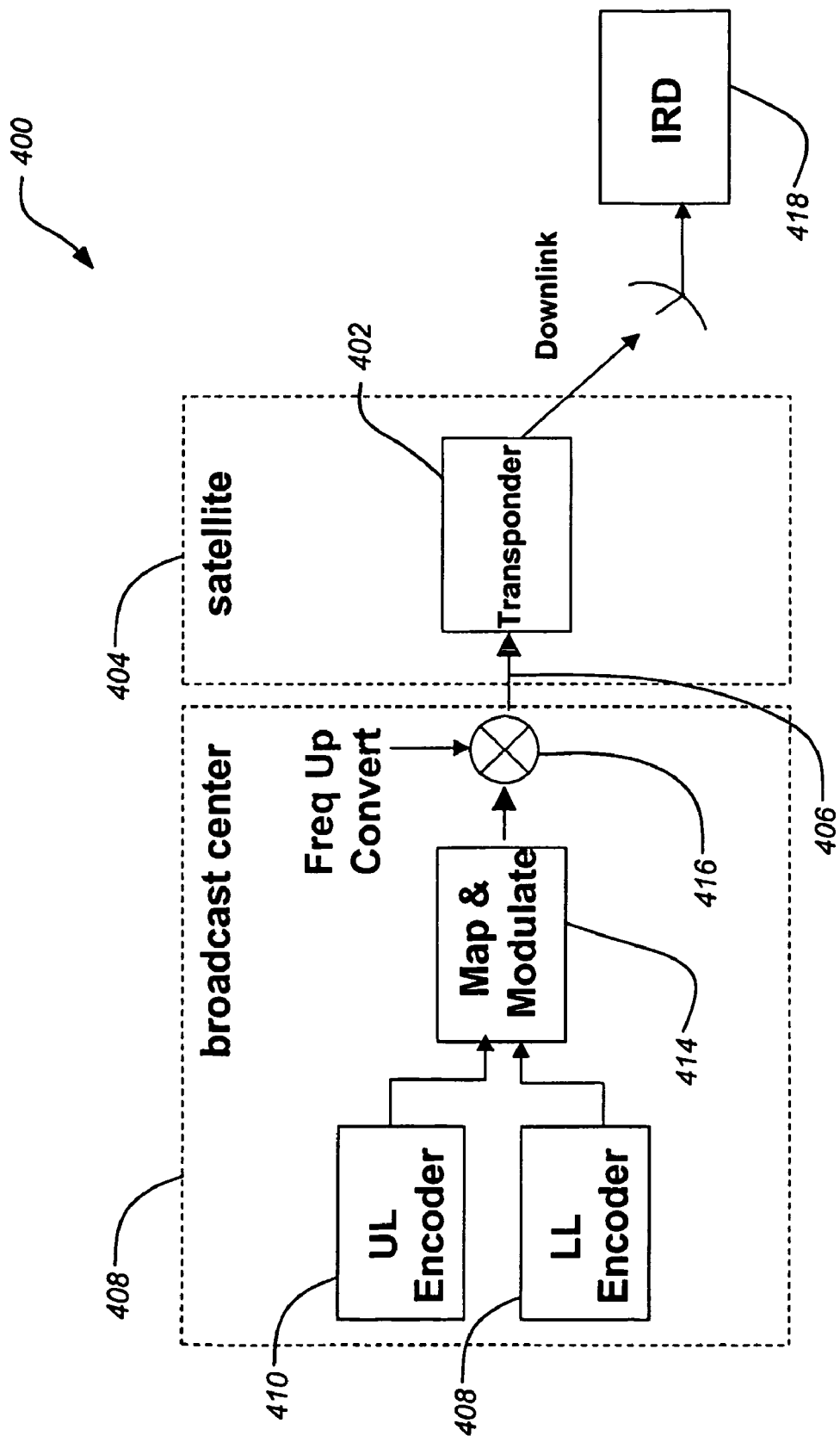
FIG. 4A is a block diagram illustrating a layered modulation system using a single transponder.

FIG. 4A is a block diagram illustrating a first layered modulation system 400 using a single transponder 402 in a satellite. The uplink signal 406 is processed at the broadcast center 408. Both the upper layer (UL) and lower layer (LL) signals 410, 412 are encoded and mapped and modulated together 414 before frequency upconversion 416. The signals 410, 412 are combined after FEC encoding. A receiver 418 decodes the downlink from the transponder 402. Conventional single traveling wave tube amplifiers (TWTAs) are suitable for constant-envelope signal such as 8 PSK and derivatives. This system is suited for layered modulation using coherent UL and LL signals.

Figure 4B:
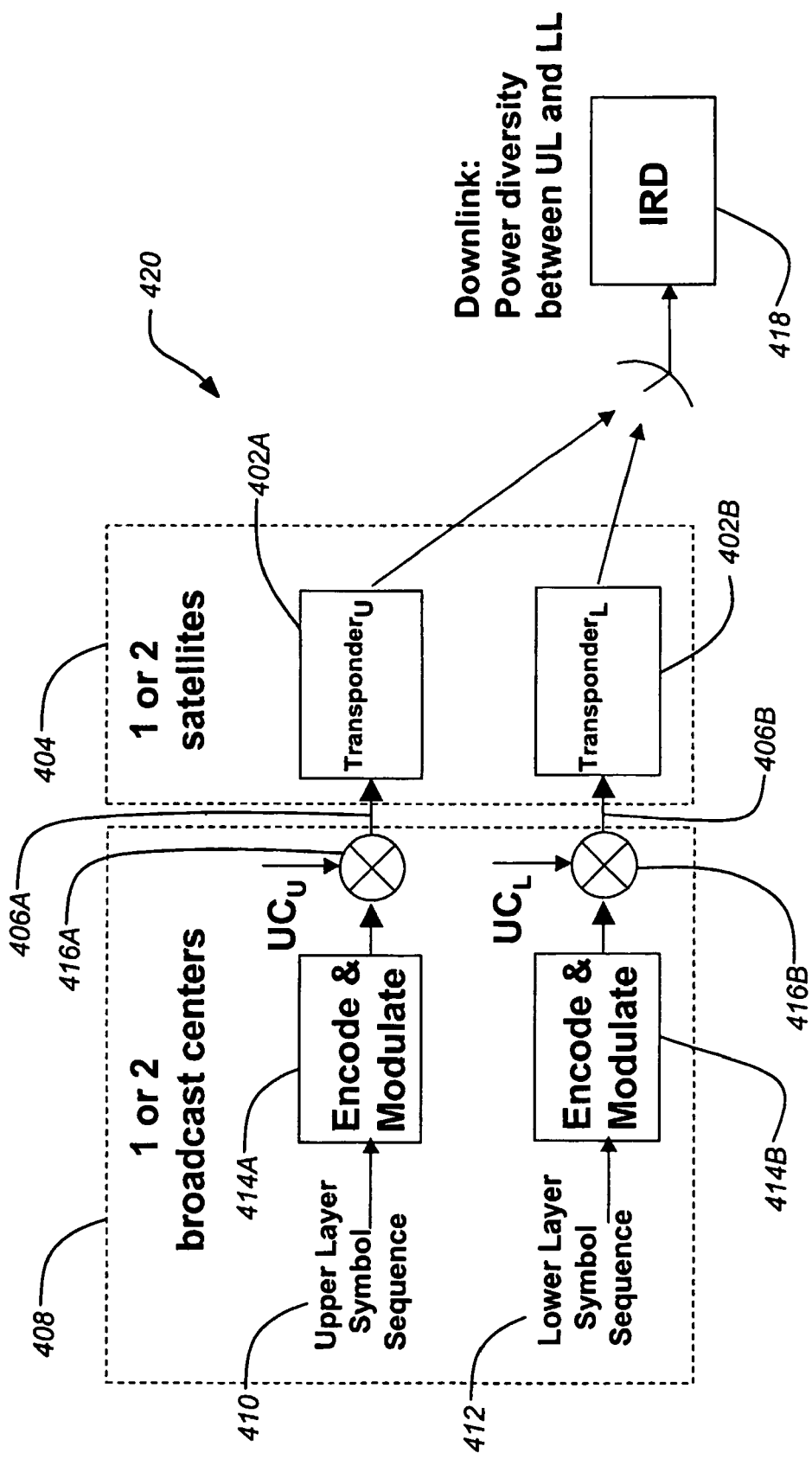
FIG. 4B is a block diagram illustrating a layered modulation system using two transponders.

FIG. 4B is a block diagram illustrating a second layered modulation system 420 using multiple transponders 402A, 402B. The upper layer (UL) and lower layer (LL) signals 410, 412 are separately encoded and mapped and modulated 414A, 414B before separate frequency upconversion 416A, 416B. A separate broadcast center 408 can be used for each layer. The signals 410, 412 are combined in space before downlink. A receiver 418 decodes the downlinked signals simultaneously received from transponders 402A, 402B. Separate TWTAs for the transponders 402A, 402B allow nonlinear TWTA outputs to be combined in space. The upper layer and lower layer signals 410, 412 can be coherent or non-coherent.

Figure 5:
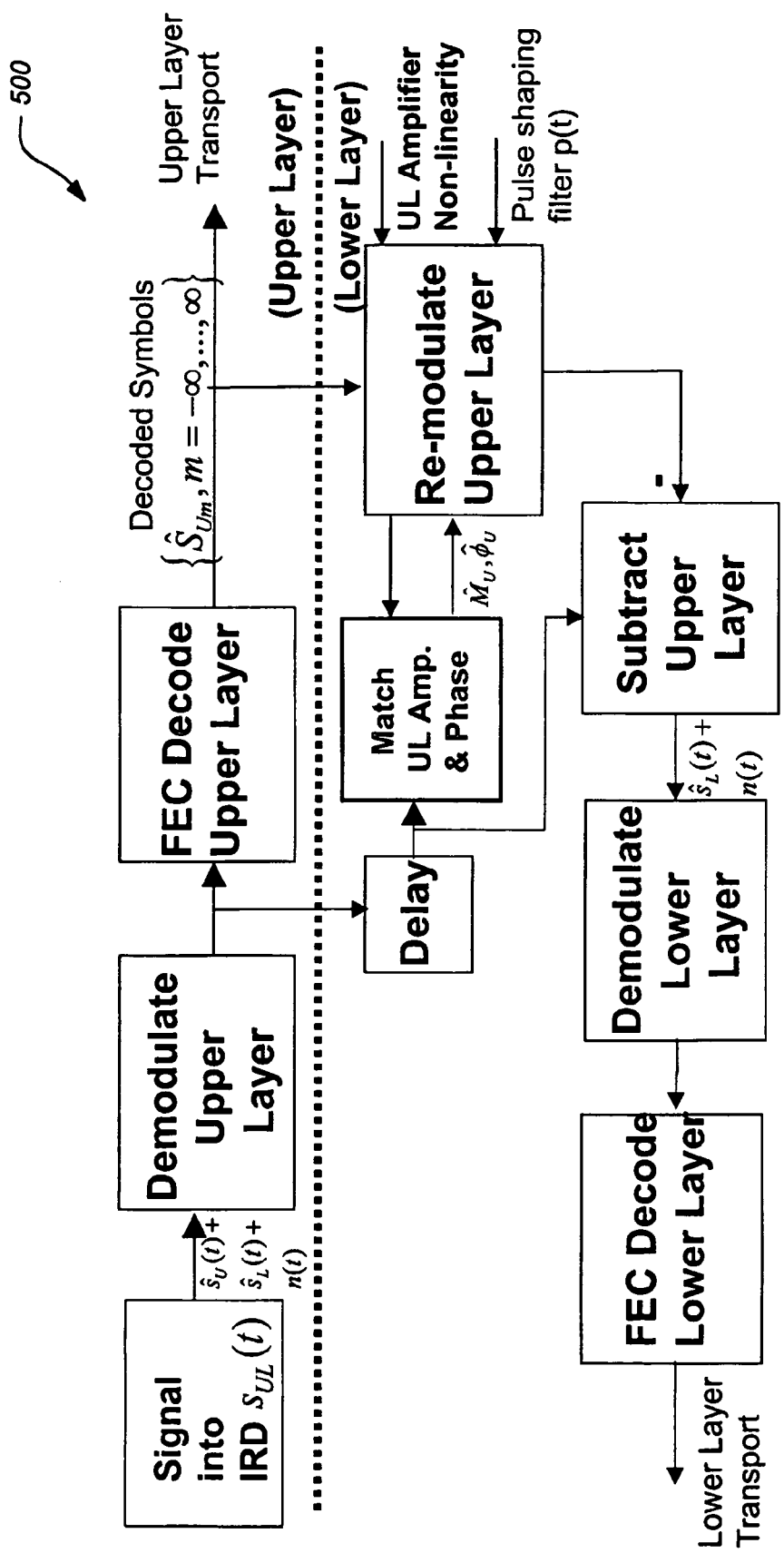
FIG. 5 is a block diagram of an exemplary receiver of a layered modulation signal.

FIG. 5 is a block diagram of an exemplary receiver 500 of a layered modulation signal, similar to those described in U.S. patent application Ser. No. 09/844,401, filed on Apr. 27, 2001, and entitled "LAYERED MODULATION FOR DIGITAL SIGNALS", by Ernest C. Chen. FEC re-encoding and remodulation may begin prior to the final decoding of the upper layer. In addition, processing is simplified for signals that are coherent between layers, particularly processing of the lower layer.

The effect of two layered modulation on channel capacity can be demonstrated by the following analysis.

$N$: Power of thermal noise $S_L$: Power of lower-layer signal with Gaussian source distrib.

$N_U$: Effective power of upper-layer noise ($N_U = S_L + N$)

$S_U$: Power of upper-layer signal with Gaussian source distrib.

$C_{CM}$: Channel capacity for Conventional Modulation (bps/Hz) with the total power $C_{LM}$: Channel capacity for Layered Modulation (bps/Hz)

$$C_{CM} = \log_2\left(1 + \frac{S_L + S_U}{N}\right)$$

$$C_{LM} = \log_2\left(1 + \frac{S_L}{N}\right) + \log_2\left(1 + \frac{S_U}{N_U}\right)$$

$$= \log_2\left[\left(1 + \frac{S_L}{N}\right)\left(1 + \frac{S_U}{N_U}\right)\right]$$

Since $$\left(1 + \frac{S_L}{N}\right)\left(1 + \frac{S_U}{N_U}\right) = 1 + \frac{S_L}{N} + \left(1 + \frac{S_L}{N}\right)\frac{S_U}{S_L + N} = 1 + \frac{S_L + S_U}{N}$$

It follows that $$C_{LM} = C_{CM}$$

Thus, assuming Gaussian source and noise distributions, sharing power between two layers does not reduce the total capacity of a layer modulation system.

The effect of an additional layer in a layered modulation system on channel capacity can also be demonstrated by the following analysis.

$N$: Power of thermal noise $S_B$: Power sum of bottom 2 signal with Gaussian source distrib.($B \equiv U + L$; $S_B = S_U + S_L$)

$N_T$: Power of top-layer noise ($N_T = S_B + N$)

$S_T$: Power of top-layer signal with Gaussian source distrib.

$C_{CM}$: Channel capacity for Conventional Modulation (bps/Hz) with the total power $C_{LM}$: Channel capacity for Layered Modulation (bps/Hz)

$$C_{CM} = \log_2\left(1 + \frac{S_B + S_T}{N}\right)$$

$$C_{LM} = \log_2\left(1 + \frac{S_B}{N}\right) + \log_2\left(1 + \frac{S_T}{N_T}\right)$$

$$= \log_2\left[\left(1 + \frac{S_B}{N}\right)\left(1 + \frac{S_T}{N_T}\right)\right]$$

Since $$\left(1 + \frac{S_B}{N}\right)\left(1 + \frac{S_T}{N_T}\right) = 1 + \frac{S_B}{N} + \left(1 + \frac{S_B}{N}\right)\frac{S_T}{S_B + N} = 1 + \frac{S_B + S_T}{N}$$

It follows that $$C_{LM} = C_{CM}$$

Thus, again assuming Gaussian source and noise distributions, sharing power among any number of layers does not reduce the total capacity.

Figure 6:
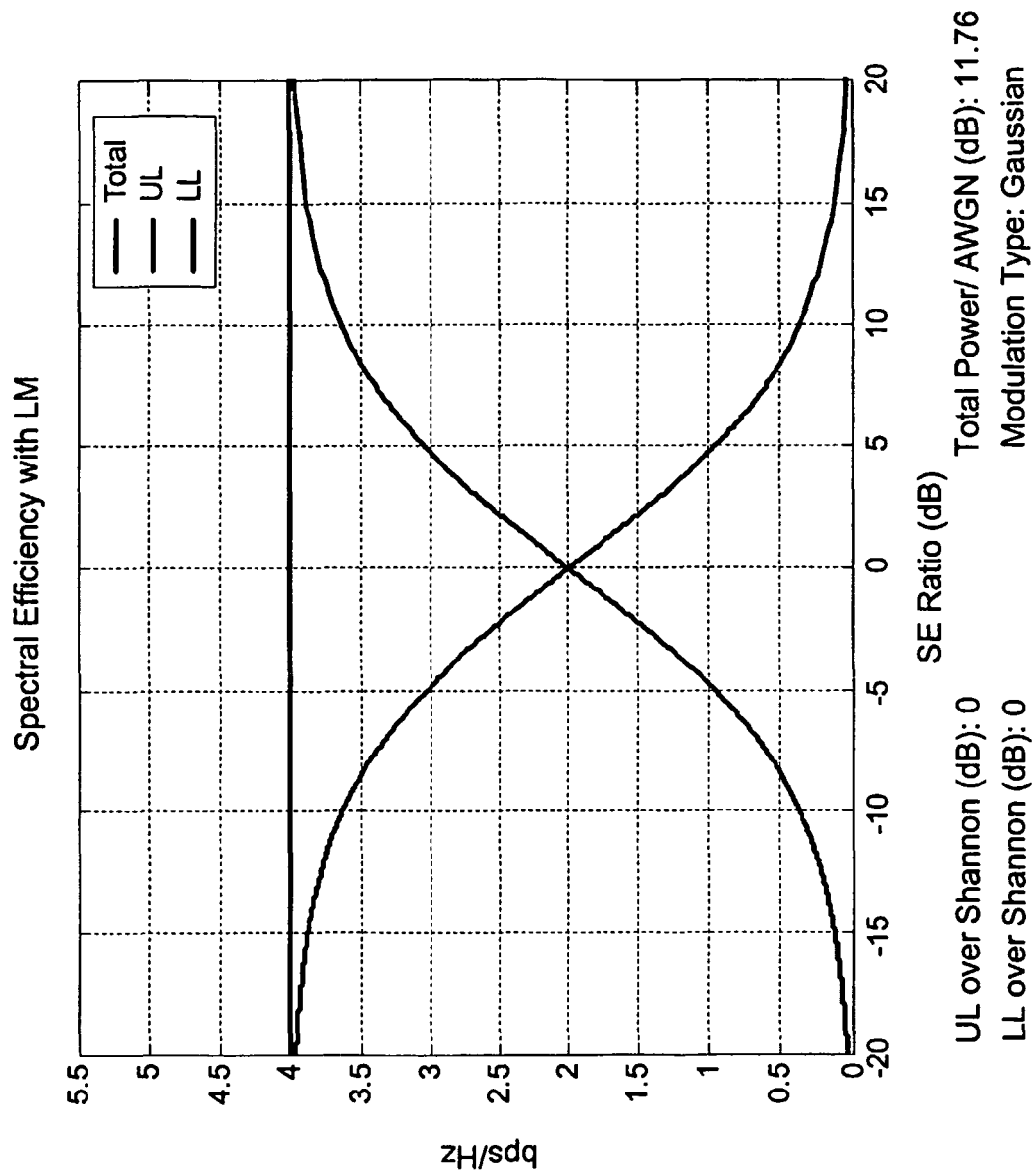
FIG. 6 is a plot illustrating channel capacity shared between upper and lower layers.

FIG. 6 is a example plot illustrating channel capacity shared between upper and lower layers. This example is for a 11.76 dB total signal power (referenced to thermal noise). The power is shared between upper and lower layer signals. A Gaussian source distribution is assumed for both layers as well as a Gaussian noise distribution. Channel capacity is approximately 4 bps/Hz for CNR of 11.76 dB. As shown, the sum of the two layer capacities always equals the total capacity.

Hierarchical 8 PSK can be viewed as a special case of layered modulation. Referring to FIG. 3B, constant power can be applied for all signals. The high priority (HP) data signal, represented by the nodes 302A-302D corresponds to the upper layer. The low priority (LP) signal, represented by the nodes 304A-304D and 304A'-304D', corresponds to the lower layer. The HP and LP signals are synchronous, having coherent phase and identical baud timing. The HP layer of an 8 PSK hierarchically modulated signal can be demodulated as if the composite signal were QPSK, typically using a decision-direct feedback tracking loop.

Figure 7:
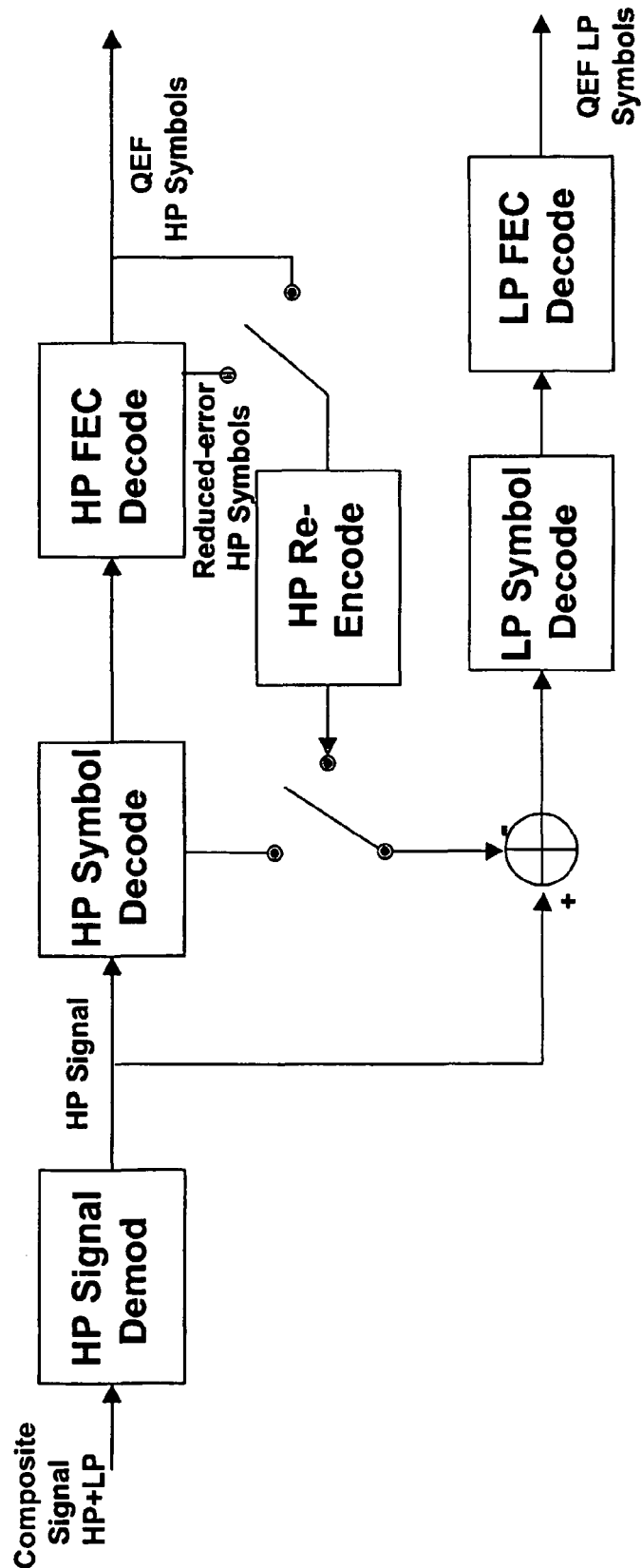
FIG. 7 is a block diagram of an exemplary receiver for hierarchical modulation.
Figure 8:
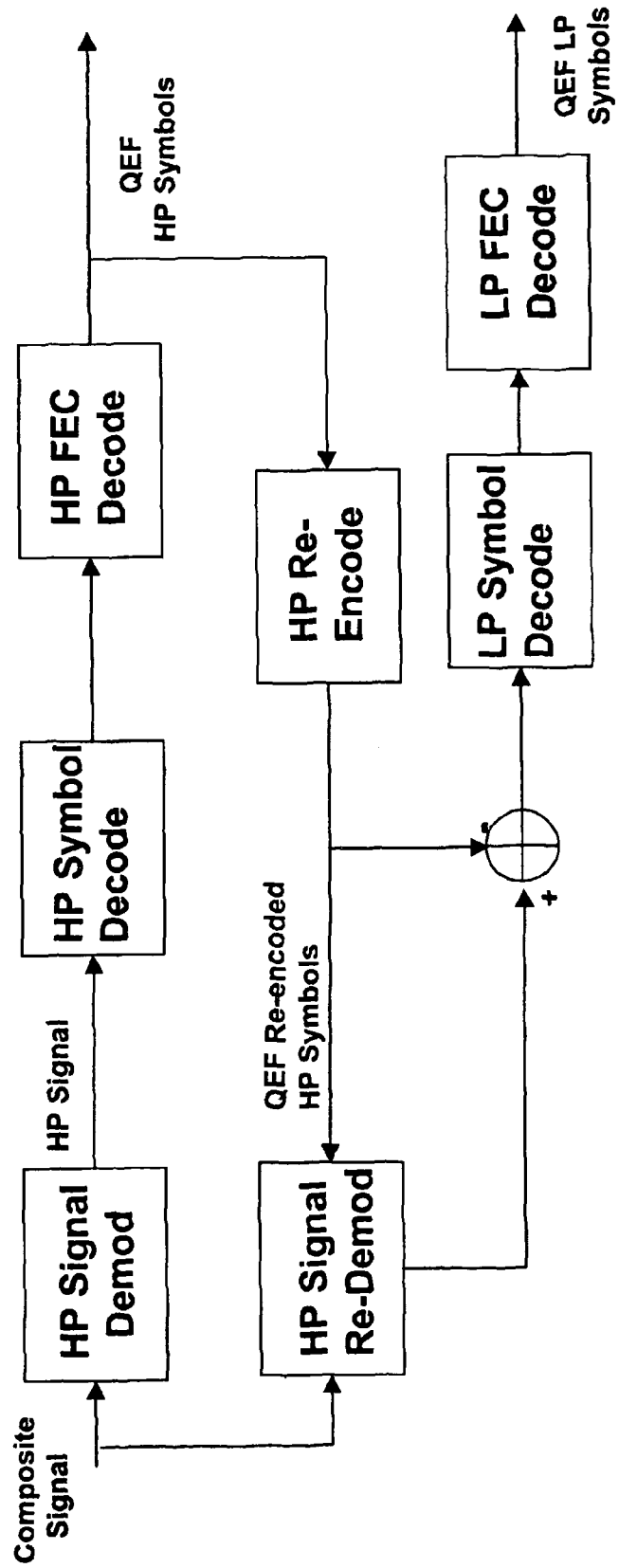
FIG. 8 is a block diagram of a second exemplary receivers for hierarchical modulation.

FIGS. 7 & 8 are block diagrams of exemplary receivers for hierarchical modulation similar to those described in PCT Patent Application No. PCT/US03/20862, filed on Jul. 1, 2003, and entitled "IMPROVING HIERARCHICAL 8 PSK PERFORMANCE", by Ernest C. Chen et al.

Layered and Hierarchical Simulation

Embodiments of the invention comprise systems and methods for simulating a layer-modulated signal, including a hierarchically modulated signal. The methods and systems presented herein can be used to accelerate the study and development of layered modulation systems while reducing costs. Many different proposed layered modulation implementations can be quickly and inexpensively evaluated.

In one exemplary embodiment an end-to-end simulation of communication channel, including satellite distortions, downlink noise, receiver phase noise and receiver implementation errors is developed. The simulator can be developed using a mathematical programming tool such as MATLAB. Standard signals can incorporated into the simulator for ready application, e.g. DIRECTV and DVB-S signals as well as turbo codes and other signals.

The simulator can be used to process computer-simulated signals or data captured from modulators and/or satellites. For example, LM signals can be emulated by RF-combining real-time signals. In addition, cross-check laboratory tests can be performed with synthesized signal performance. A field programmable gate array (FPGA) LM signal processor essentially mimics a LM simulator of the invention, but with real time processing.

Figure 9:
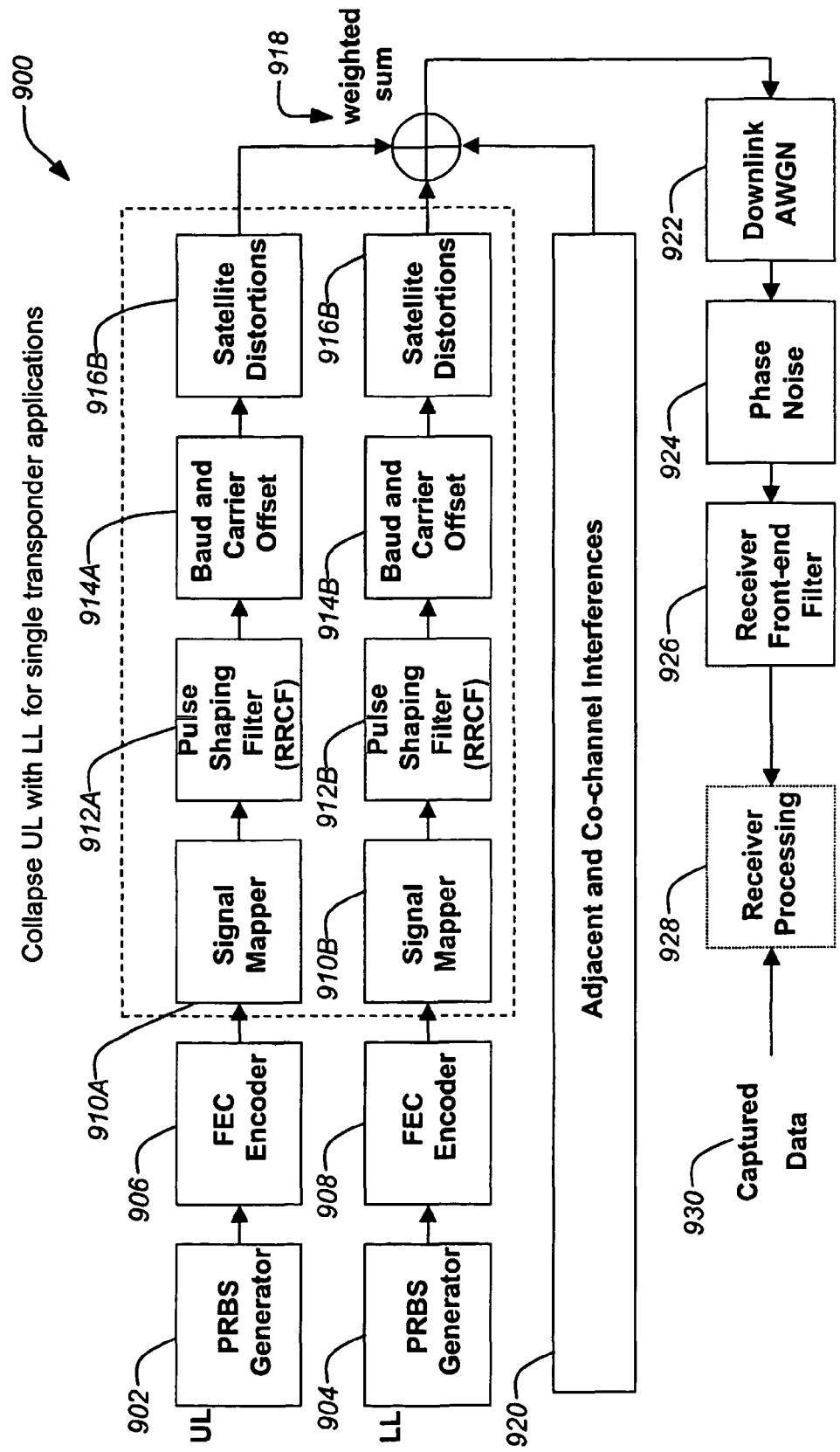
FIG. 9 is a block diagram of an exemplary layer modulated signal simulator.

FIG. 9 is a block diagram of a complete simulation 900 of a layer modulated signal. Pseudorandom binary sequence (PRBS) generators 902, 904 are used to create the upper and lower layer data. Data from each layer is then passed through an forward error correction (FEC) encoder 906, 908. After FEC encoding the signals can be processed to simulate either a single or dual-transponder system. See FIGS. 4A and 4B. If a dual-transponder system is being simulated (as in FIG. 4B), the upper and lower layers are processed separately. Each signal layer is separately passed through a signal mapper 910A, 910B, a pulse shaping filter 912A, 912B (e.g., a root raised cosine filter), a baud timing and carrier frequency offset simulator 914A, 914B, and a satellite distortion simulator 916A, 916B. If a single transponder system is being simulated (as in FIG. 4A), the upper and lower layers are combined and passed through the same set of processes together with a weighted summation contained in signal mapper 910. For a dual-transponder system, the upper and lower layers are combined at the output in a weighted summation 918. In either case, modeled channel interference effects 920 (adjacent and co-channel) are added. The composite signal is then processed by adding white Guassian noise provided by a noise generator 922, phase noise from a phase noise generator 924 and frequency filtering by a receiver front end filter 926 before receiver processing 928. Captured data 930 from laboratory equipment that provide the same functionality as the simulation modules (902, 904 . . . all items in FIG. 9 except 930 and 928) can be applied to the receiver processing to evaluate performance.

Figure 10:
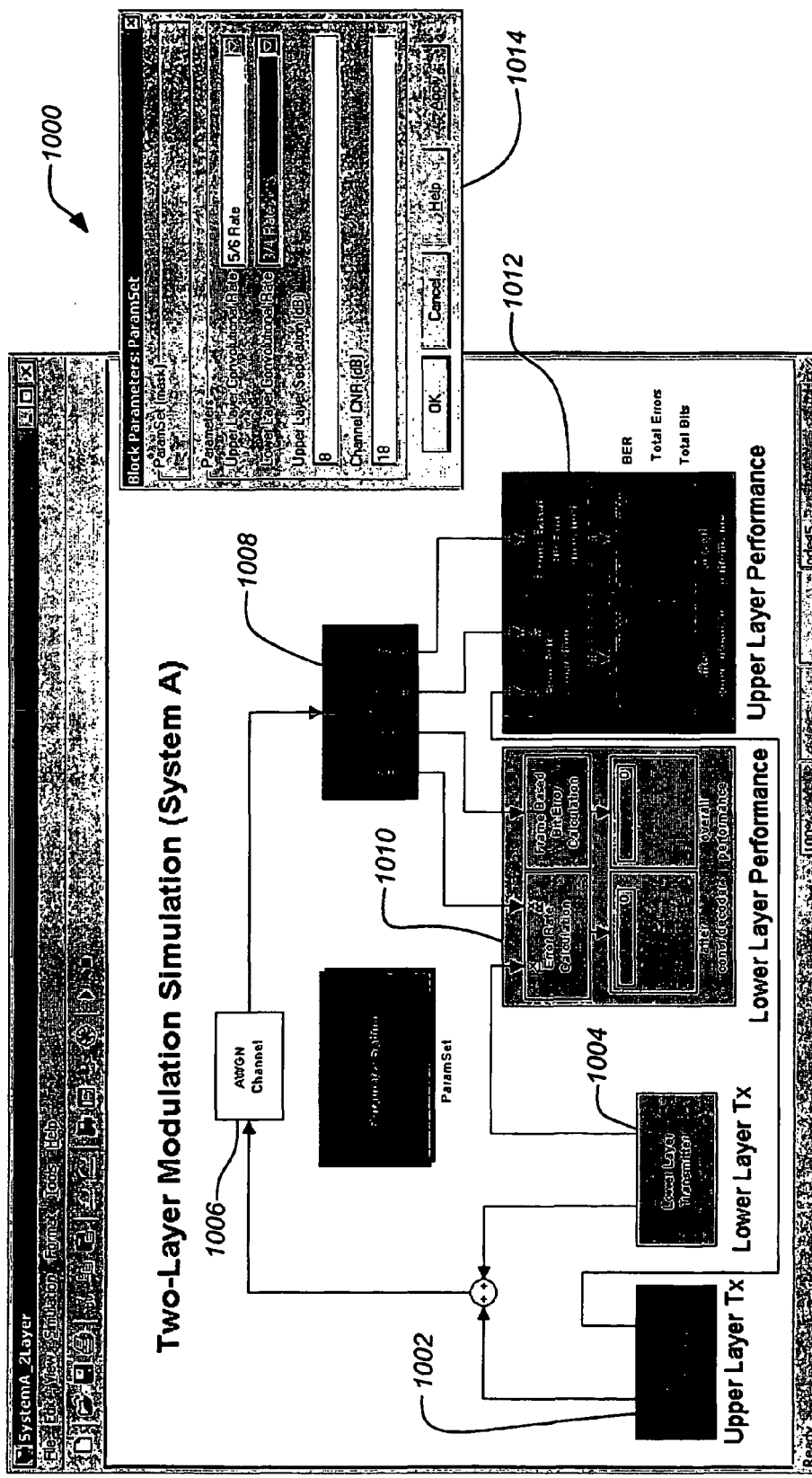
FIG. 10 is a GUI of an exemplary layer modulated signal simulator showing BER test results.

FIG. 10 is a graphical user interface (GUI) 1000 of an exemplary layer modulated signal simulator including several blocks of FIG. 9 showing BER test results. The display outlines the simulator signal processing flow. Upper and lower layer signal transmitters 1002, 1004 are shown with signal outputs combined and passed through the additive white Gaussian noise (AWGN) channel 1006. The composite signal then arrives at the receiver 1008. Lower layer outputs are provided to a lower layer performance measurement block 1010 along with the original lower layer signal from the lower layer transmitter 1004. Similarly, upper layer outputs are provided to an upper layer performance measurement block 1012 along with the original upper layer signal from the upper layer transmitter 1002. An error rate and frame based bit error calculation are performed for each layer to establish a performance measurement. Operational parameters can be set in a dialog box 1014.

Figure 11A:
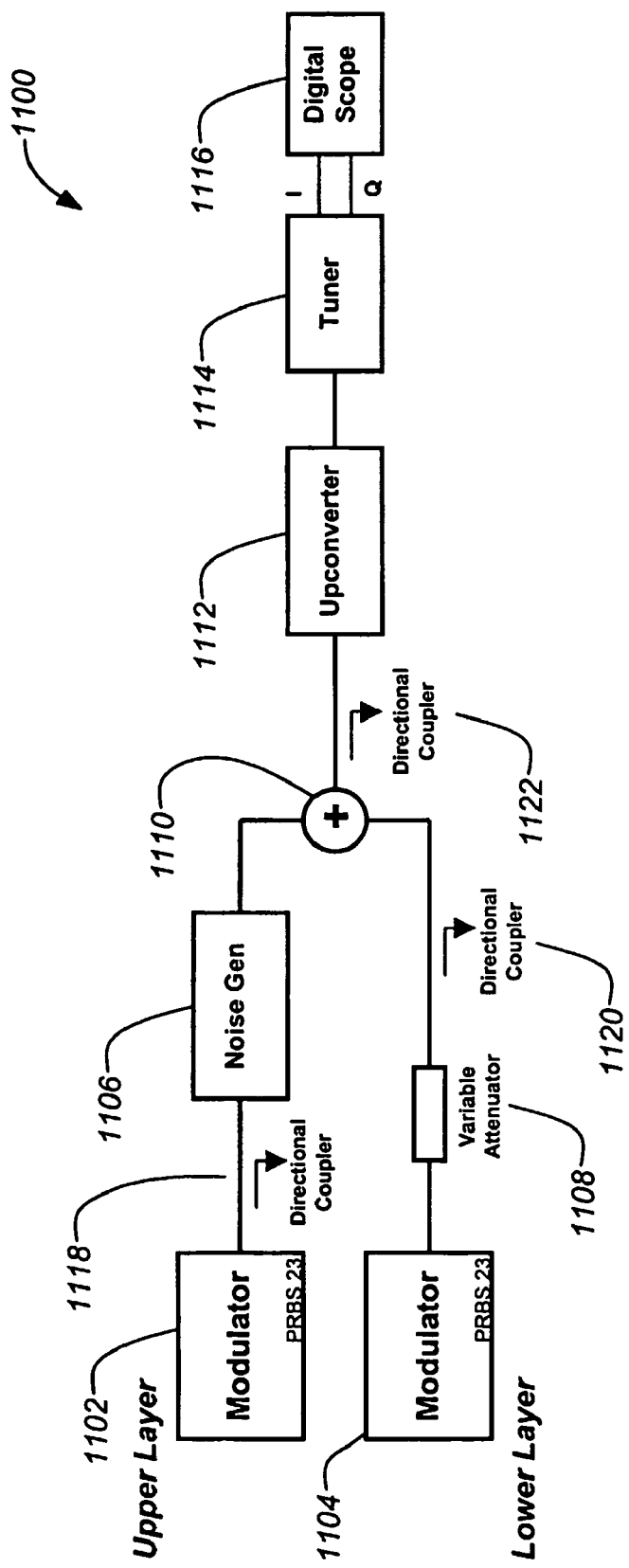
FIG. 11A is a block diagram of an exemplary system for simulating a layer modulated signal in a laboratory.

FIG. 11A is a block diagram of an exemplary system 1100 for synthesizing a layer modulated signal in a laboratory. A first modulator 1102 is used to modulate a first bit stream, e.g. a PRBS, of the upper layer to produce an upper layer signal. A noise generator 1106 can be used to add noise to the upper layer signal. A second modulator 1104 is used for modulating a second bit stream of a lower layer to produce a lower layer signal. An attenuator 1108, (such as variable attenuator) can be used for appropriately attenuating the lower layer signal. A combiner 1110 is then used to combining the noise-added upper layer signal and the attenuated lower layer signal to produce the composite layer modulated signal. (Equivalently, noise generator 1106 with a corresponding output power level may be placed on the lower layer path instead of the upper layer path.) The composite layer modulated signal can then be upconverted 1112 before being communicated to a tuner 1114 to extract the in-phase and quadrature components of the separate signal layers, analyzed using a scope 1116 as desired. If a digitizing oscilloscope is used, the digitized in-phase and quadrature signals can be introduced as the Captured Data 930 in FIG. 9. Directional couplers 1118, 1120 can be used to tap the upper layer signal (prior to noise addition) and the lower layer signal (after attenuation) to be used in evaluating the relative power levels of the upper and lower layer signals prior to the addition by the combiner 1110. Similarly, the composite signal can also be tapped by a direction coupler 1122.

Figure 11B:
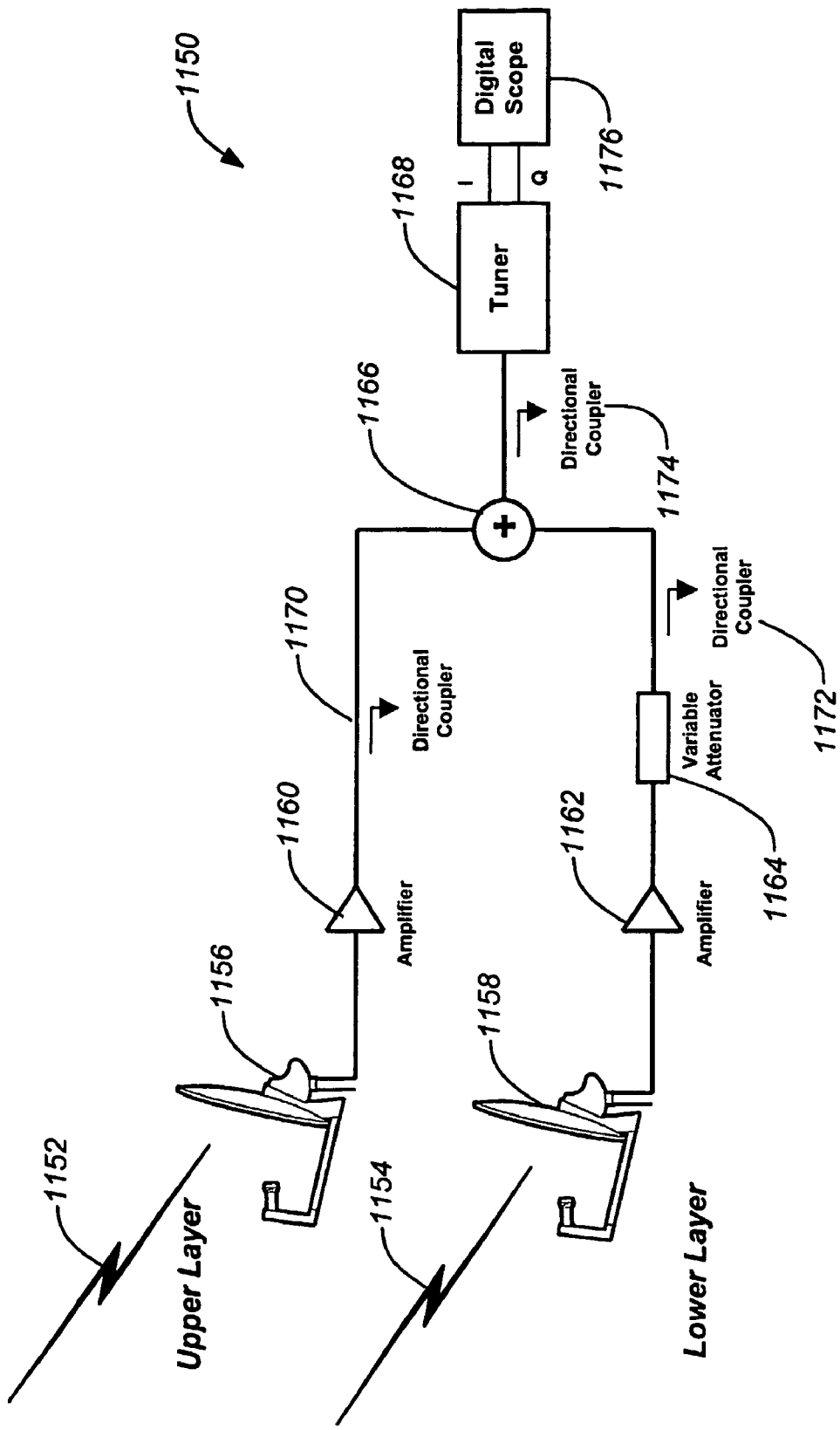
FIG. 11B is a block diagram of an exemplary system for simulating a layer modulated signal using satellite signals.

FIG. 11B is a block diagram of an exemplary system 1150 for simulating a layer modulated signal using satellite signals. Distinct satellite signals 1152, 1154 are received at separate antennas 1156, 1158. It is important to note that the two received signals 1152, 1154 are not layered modulation signals. Both signals 1152, 1154 are passed through separate amplifiers 1160, 1162. The satellite signal 1154 to be used as the lower layer signal is passed through an attenuator 1164 (such as a variable attenuator) to appropriately attenuate the signal. Both signals are then combined at the combiner 1166 to form the composite layered modulation signal. The composite signal can then be communicated to a tuner 1168 to extract the in-phase and quadrature components of the separate signal layers which may be analyzed using a scope 1176. If a digitizing oscilloscope is used, the digitized in-phase and quadrature signals can be introduced as the Captured Data 930 in FIG. 9. Directional couplers 1170, 1172, 1174 can be used to tap the upper layer signal, lower layer signal and the composite signal, respectively. These tapped signal are used to evaluate the signal and/or attenuator performance. This system 1150 requires less expensive equipment than the embodiment of FIG. 11A (particularly, omitting the modulators 1102, 1104). In addition, because actual satellite signals 1152, 1154 are used, real signal effects are included in the composite layer modulated signal.

Figure 12:
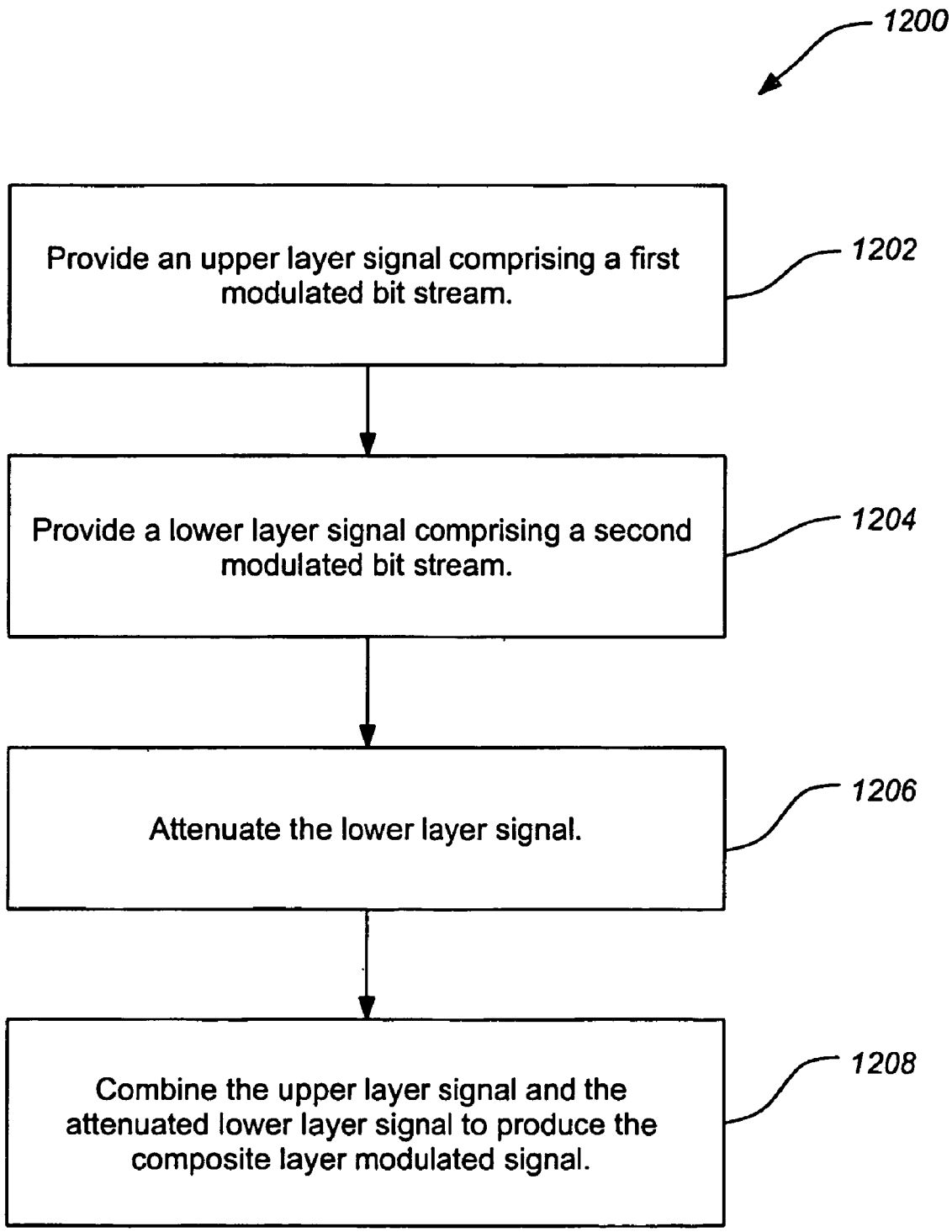
FIG. 12 is flowchart of an exemplary method for simulating a layer modulated signal.

FIG. 12 is flowchart of an exemplary method 1200 for simulating a layer modulated signal. The method applies to the systems of both FIGS. 11A & 11B. The method 1200 simulates a layer modulated signal having a first modulation of an upper layer and a second modulation of a lower layer. At step 1202 an upper layer signal is provided comprising a first modulated bit stream. At step 1204, a lower layer signal is provided comprising a second modulated bit stream. Next at step 1206, the lower layer signal is attenuated. Finally at step 1208, the upper layer signal and the attenuated lower layer signal are combined to produce the composite layer modulated signal. The method can be further modified consistent with the foregoing system embodiments.

Figure 13:
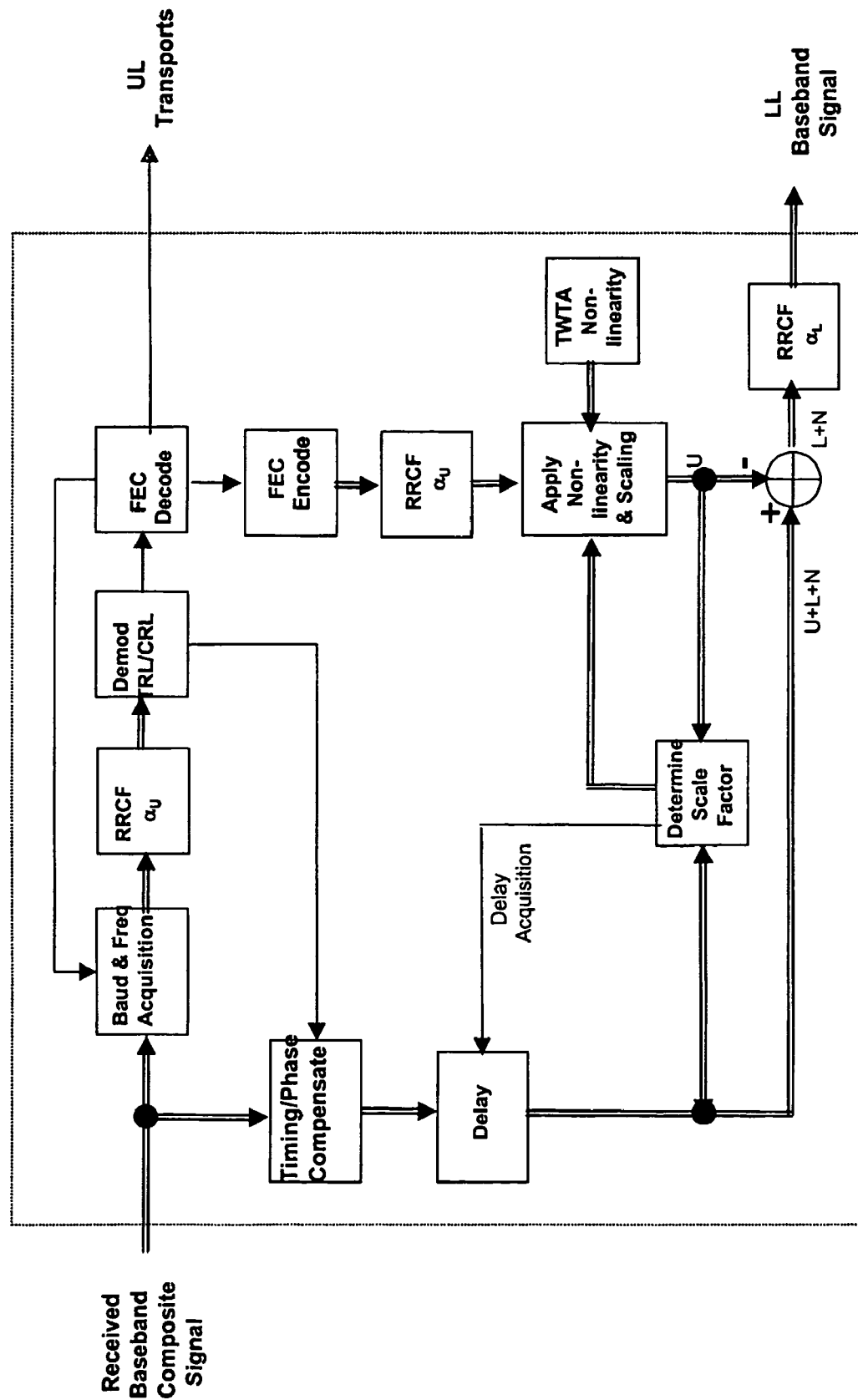
FIG. 13 is a flowchart of exemplary processing for a layer modulated signal.

FIG. 13 is a flowchart of processing for a layer modulated signal. Further detail of layered modulation processing can be found U.S. patent application Ser. No. 09/844,401, filed on Apr. 27, 2001, and entitled "LAYERED MODULATION FOR DIGITAL SIGNALS", by Ernest C. Chen. Layered modulation simulation methods and systems of the invention can be used to evaluate the performance of layered signals as well as receiver processes.

Exemplary Layered Modulation Simulation

An exemplary computer simulation of a layered modulation signal can be defined with the following parameters. Both layers can use a nominal symbol frequency of 20 MHz (not necessarily synchronized to each other in timing frequency and phase). The carrier frequencies are not necessarily coherent with respect to each other either. The excess bandwidth ratio is 0.2. It is assumed that no satellite degradation of the signal occurs; TWTA and filter effects can be modeled separately if necessary. The upper and lower layer signals can each be a convolutional code 6/7, Reed-Soloman (146, 130) signal with an assigned reference power of 0 dB to the upper layer. Upper layer CNR is approximately 7.7 dB. Lower layer CNR is approximately 7.6 dB. Noise (AWGN) of −16 dB can be applied. A turbo-coded signal may alternately be used for the lower layer. Phase noise of the low noise block (LNB) and tuner are included. The following table summarizes the simulation results.

| Input CNR (dB) | | Output CNR (dB) | | Dynamic Range |
|---|---|---|---|---|
| UL | LL | UL | LL | |
| 7.6 | None | 7.43 | None | 7.43 |
| 7.7 | 7.6 | 7.51 | 7.22 | 15.48 |

The first row applies to processing only the upper layer, which reduces CNR by approximately 0.2 dB (7.6 dB−7.43 dB). The second row applies to processing both layers. The lower layer CNR is reduced by approximately 0.4 dB (7.6 dB−7.22 dB). This result compares favorably with nominal 16 QAM performance. Further details of the simulation process are shown hereafter.

Figure 14:
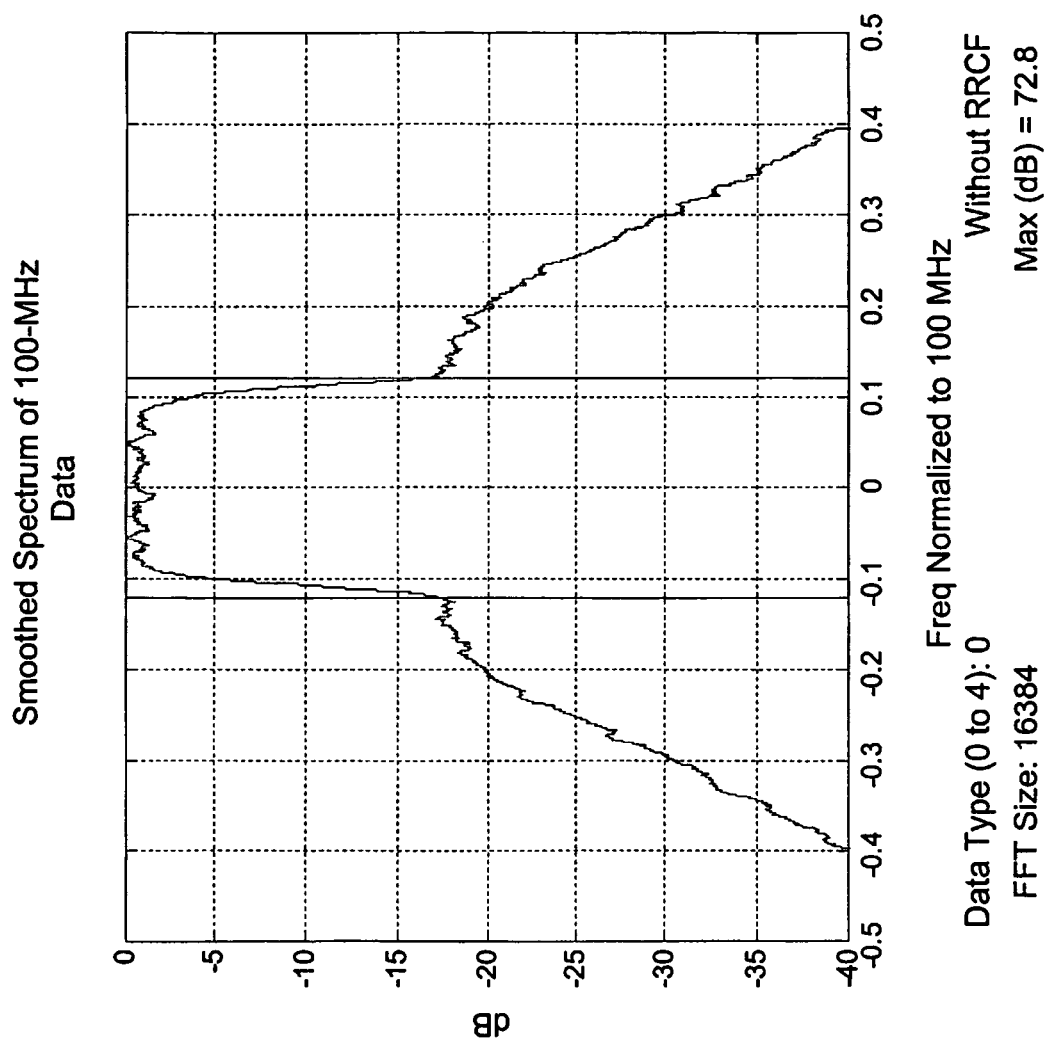
FIG. 14 is power spectrum plot of an exemplary layer modulated signal.

FIG. 14 is power spectrum plot of an exemplary layer modulated signal that can be simulated by the method and system previously described. The composite upper and lower layer signals are added with thermal noise. A sampling frequency of 100 MHz is used and a display resolution of 1 MHz is shown. The spectrum peak is scaled to 0 dB, showing a thermal noise floor of approximately −17 dB. A front end receiver filter is used to taper the noise floor.

Figure 15A:
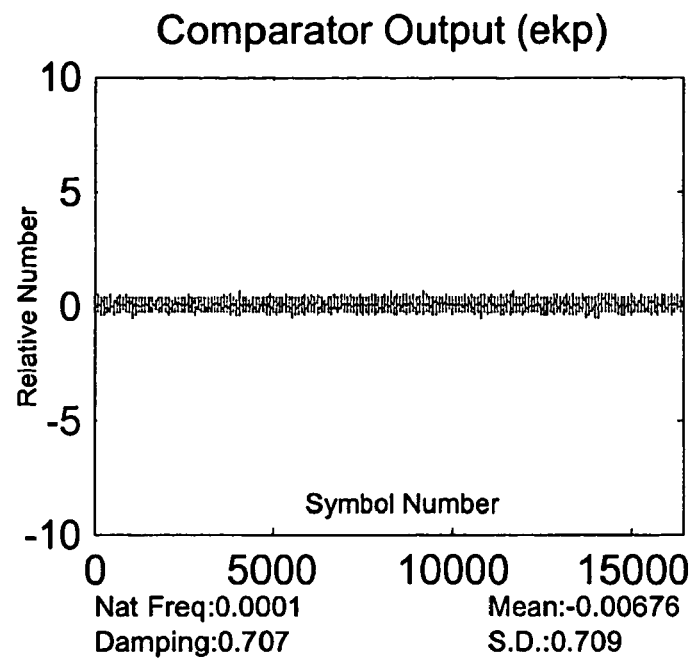
FIGS. 15A-15C are plots illustrating upper layer symbol timing recovery for an exemplary layer modulated signal.
Figure 15B:
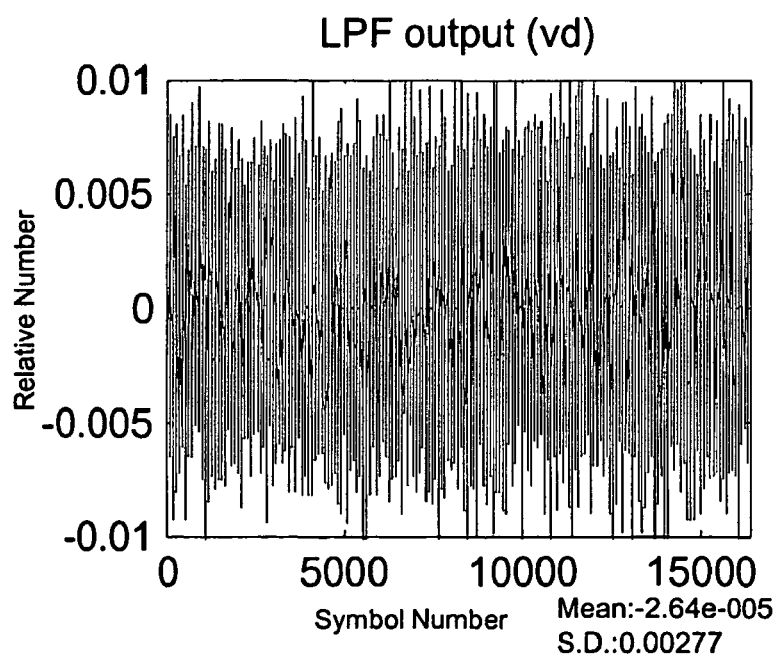
Figure 15C:
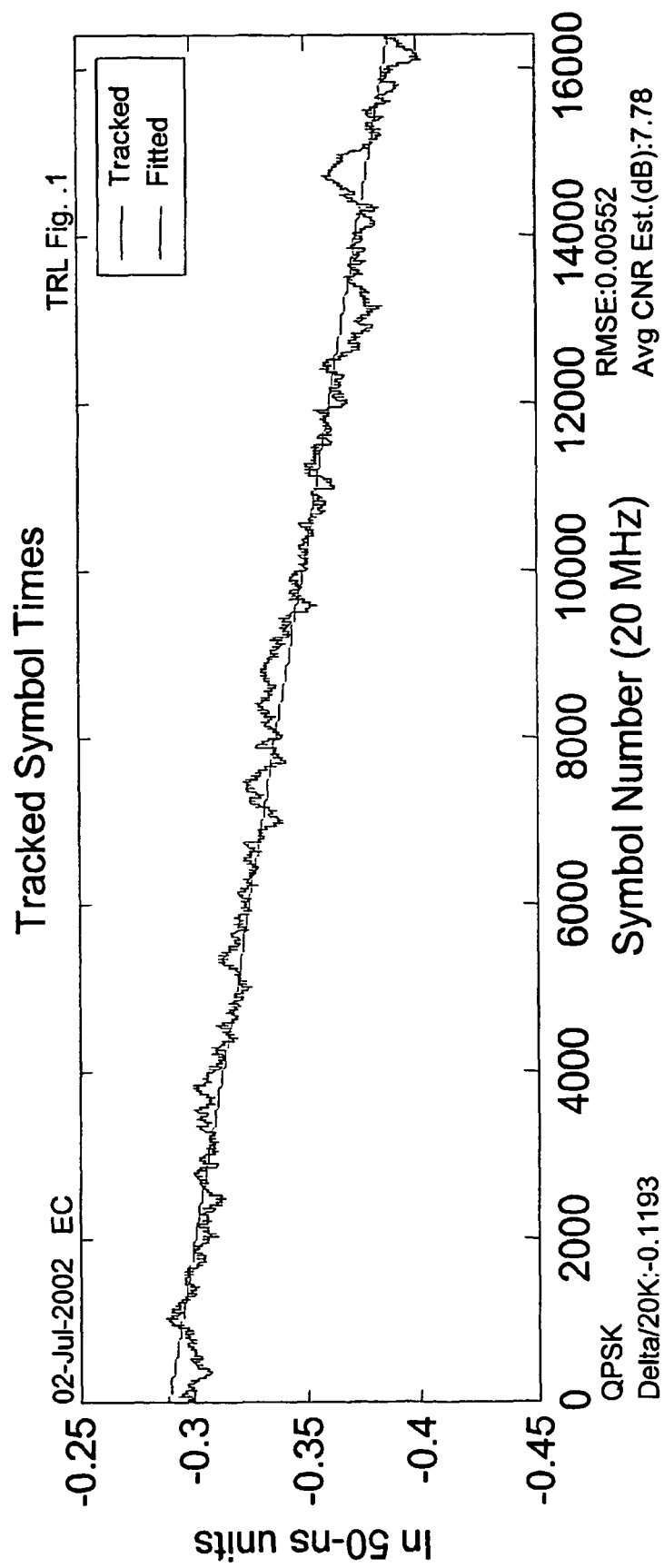

FIGS. 15A-15C are plots illustrating upper layer symbol timing recovery for an exemplary layer modulated signal. FIG. 15A is a plot of the comparator output, based on a zero-crossing method. FIG. 15B is the low pass filter (LPF) output of the loop filter; a decision-directed second order filter is applied. A nominal baud rate of 20 MHz is recovered. FIG. 15C is a plot of the tracked symbol times (indicating a delta baud rate) with a fitted curve overlaid. A small RMS error is exhibited.

Figure 15D:
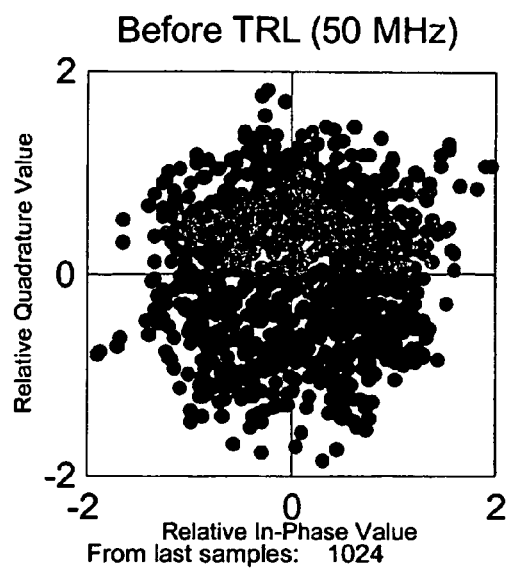
FIGS. 15D-15F are plots illustrating an upper layer symbol timing recovered signal for an exemplary layer modulated signal.
Figure 15E:
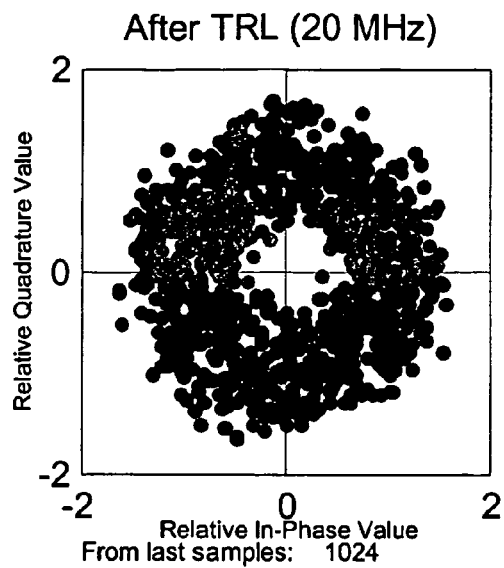
Figure 15F:
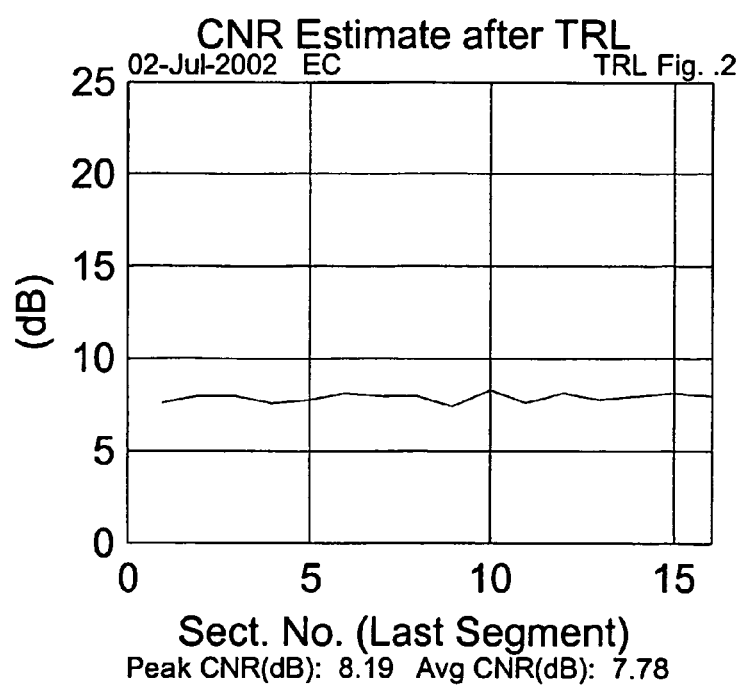

FIGS. 15D-15F are plots illustrating an upper layer symbol timing recovered signal for an exemplary layer modulated signal. FIGS. 15D and 15E illustrate respectively the upper layer signal before and after the timing recovery loop. FIG. 15F is a plot of the CNR estimate after the timing recovery loop. The estimated output CNR of 7.78 dB, which includes measurement errors, compares very favorably with the input CNR of 7.7 dB.

Figure 16A:
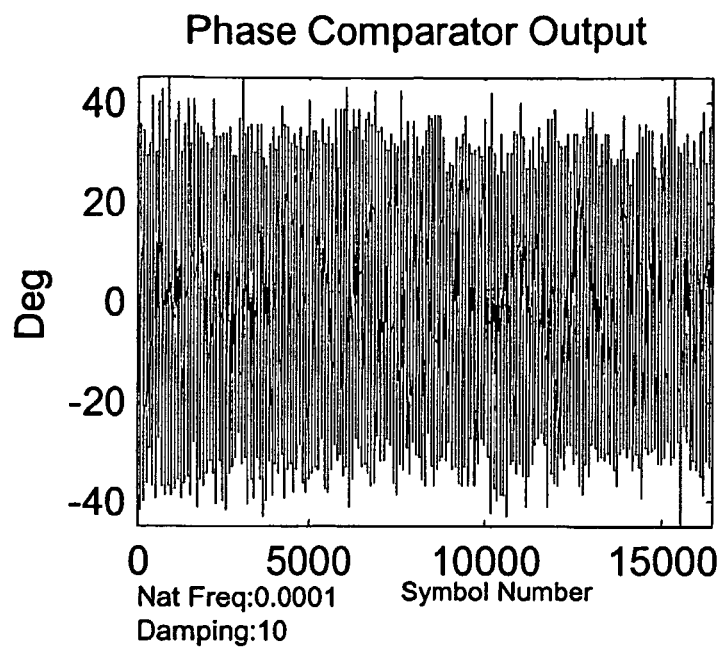
FIGS. 16A-16C are plots illustrating upper layer carrier recovery for an exemplary layer modulated signal.
Figure 16B:
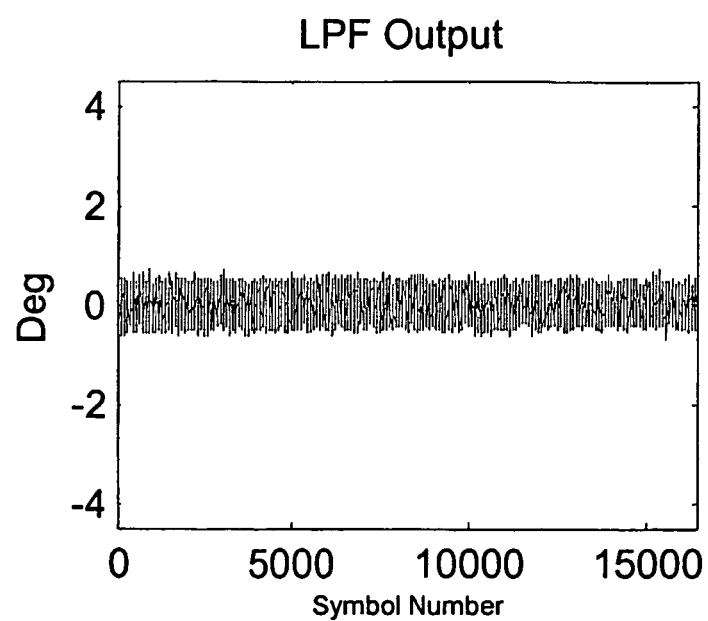
Figure 16C:
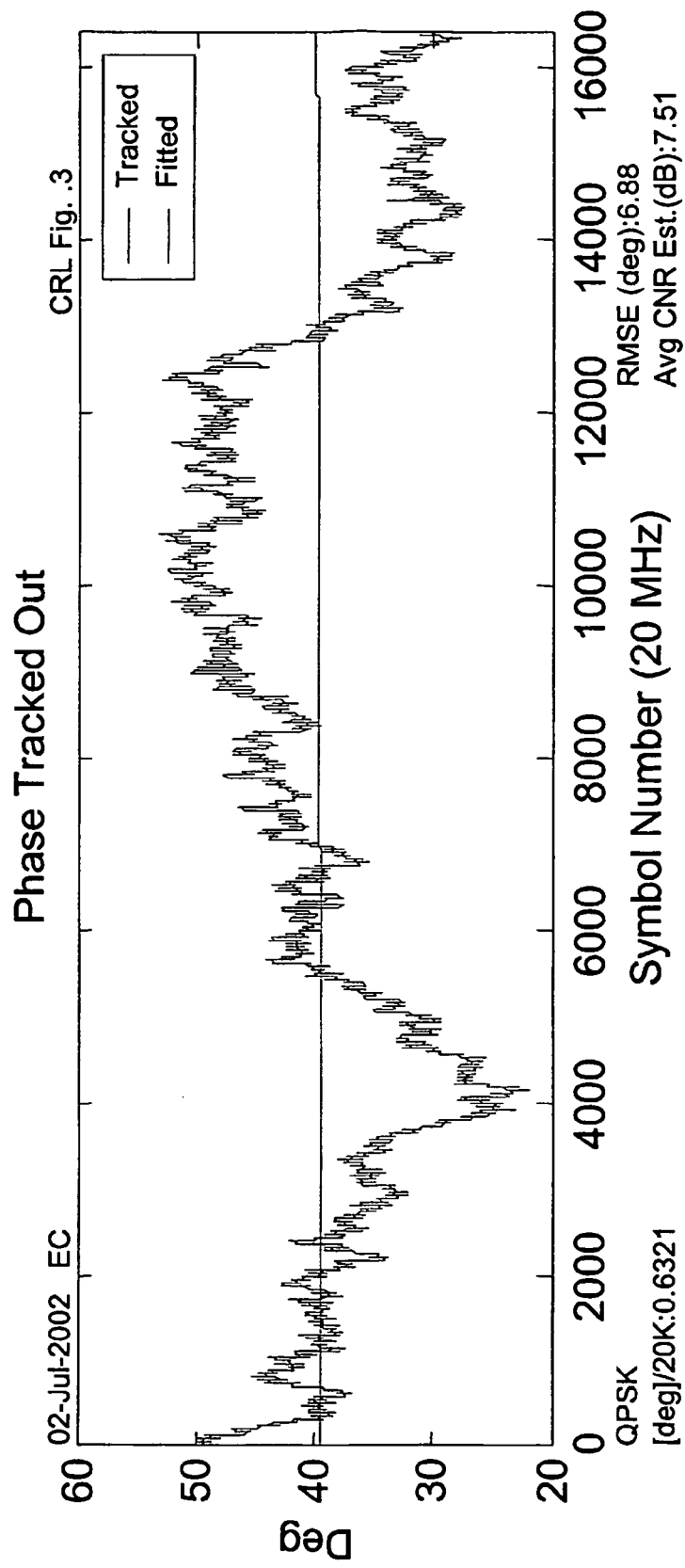

FIGS. 16A-16C are plots illustrating upper layer carrier recovery for an exemplary layer modulated signal. FIG. 16A is a plot of the phase comparator output, based on quadrature multiplication. FIG. 16B is a plot of the loop LPF output, using a decision-directed second order scheme. A baud rate of approximately 20 MHz is recovered. FIG. 16C is a plot of the phase tracked out for the simulated carrier frequency and phase noise. A small RMS error in phase is exhibited.

Figure 16D:
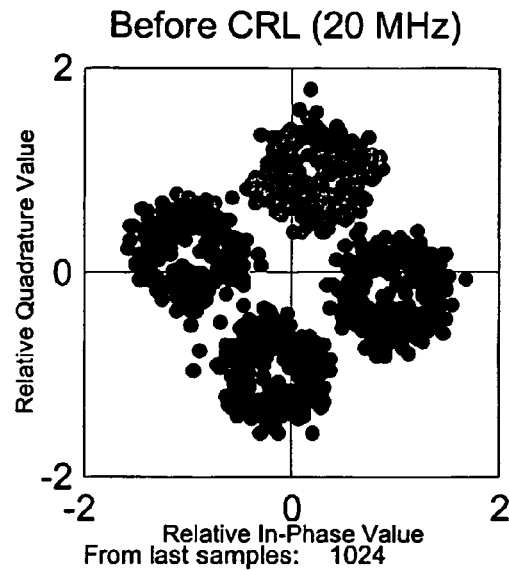
FIGS. 16D-16F are plots illustrating an upper layer carrier recovered signal for an exemplary layer modulated signal.
Figure 16E:
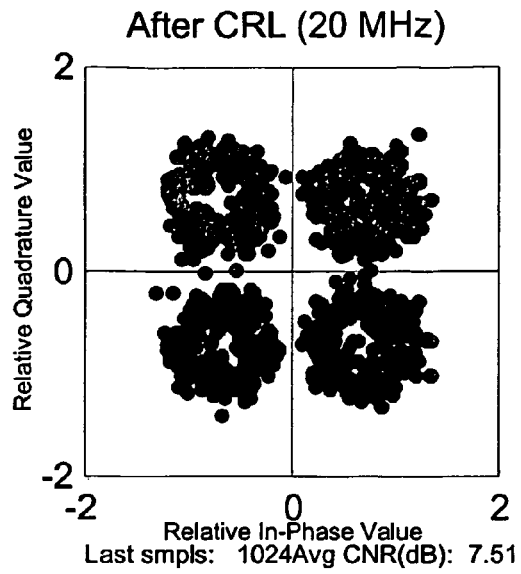
Figure 16F:
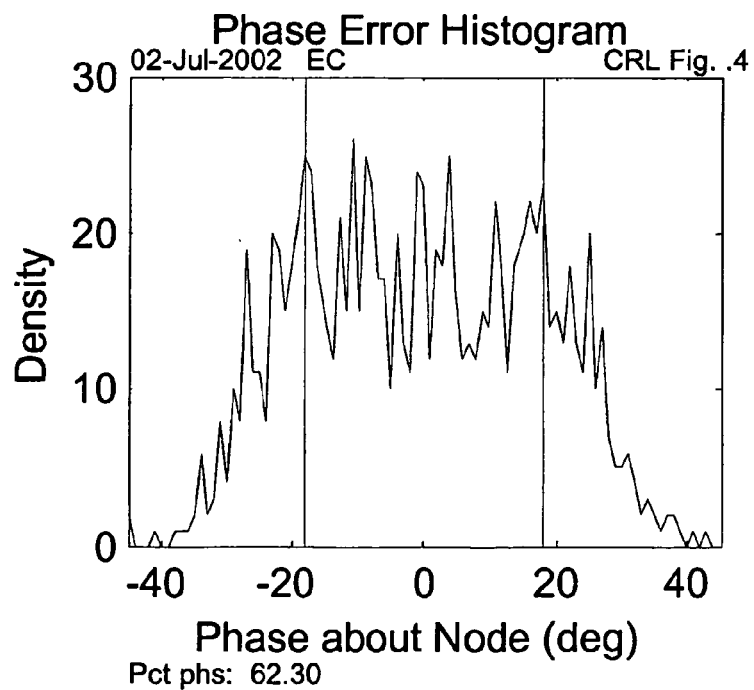

FIGS. 16D-16F are plots illustrating an upper layer carrier recovered signal for an exemplary layer modulated signal. FIG. 16D illustrates the upper layer signal before the carrier recovery loop. FIG. 16E illustrates the upper layer signal after the carrier recovery loop when the signal constellation is stabilized; the upper layer QPSK signal in the presence of the lower layer QPSK and noise are apparent. FIG. 16F is a histogram of the phase error about a constellation node. The estimated output CNR of 7.51 dB compares well with the input CNR of 7.7 dB.

Figure 17A:
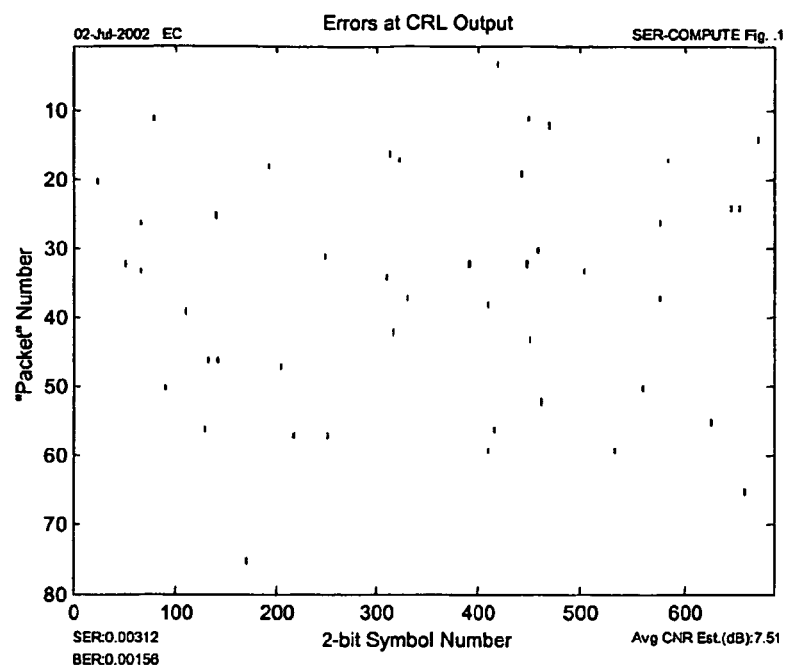
FIG. 17A is a plot of uncoded upper layer bit errors at the demodulator output for an exemplary layer modulated signal.

FIG. 17A is a plot of uncoded upper layer bit errors at the demodulator output for an exemplary layer modulated signal. The errors at the carrier recovery loop output are shown. The plot identifies 80 R-S packets of data by the "packet" number versus the two-bit symbol number. The plot reports approximately 0.16% of BER at an estimated CNR of 7.5 dB.

Figure 17B:
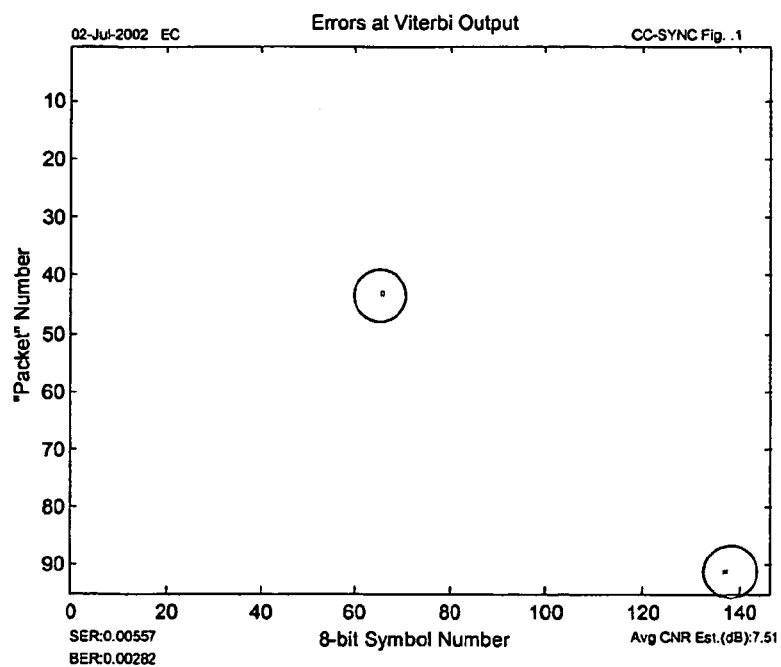
FIG. 17B is a plot of upper layer byte errors at the Viterbi decoder output for an exemplary layer modulated signal.

FIG. 17B is a plot of upper layer byte errors at the Viterbi decoder output for an exemplary layer modulated signal. The packet number is displayed versus an eight-bit symbol number, showing 95 packets worth of data. A BER of 0.282% is reported.

Figure 17C:
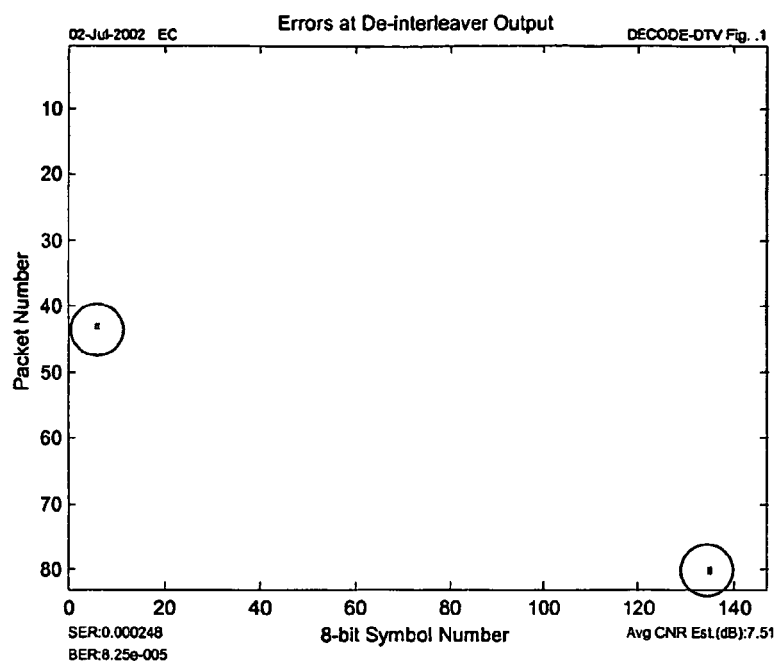
FIG. 17C is a plot of upper layer byte errors at the de-interleaver output for an exemplary layer modulated signal.

FIG. 17C is a plot of upper layer byte errors at the de-interleaver output for an exemplary layer modulated signal. The packet number is displayed versus an eight-bit symbol number, showing 83 packets worth of data.

Figure 17D:
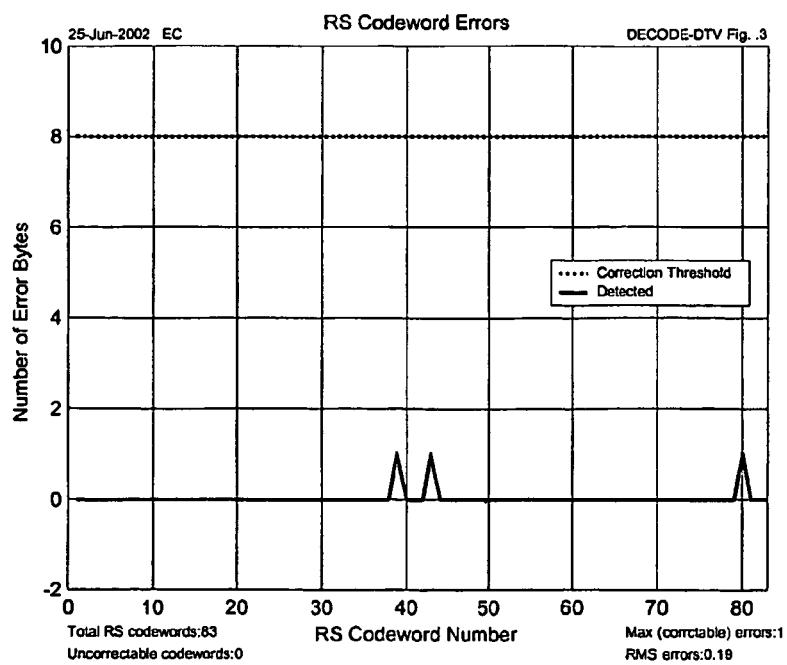
FIG. 17D is a plot of upper layer errors correctable by a Reed-Solomon decoder for an exemplary layer modulated signal.

FIG. 17D is a plot of upper layer errors correctable by a Reed-Solomon decoder for an exemplary layer modulated signal. Of the 83 packets worth of data, only 3 packets with one R-S correctable error byte each occurred, which is well below the correction threshold of eight errors. Thus, no uncorrectable errors were exhibited in 83 packets at an estimated CNR of 7.5 dB.

Figure 18:
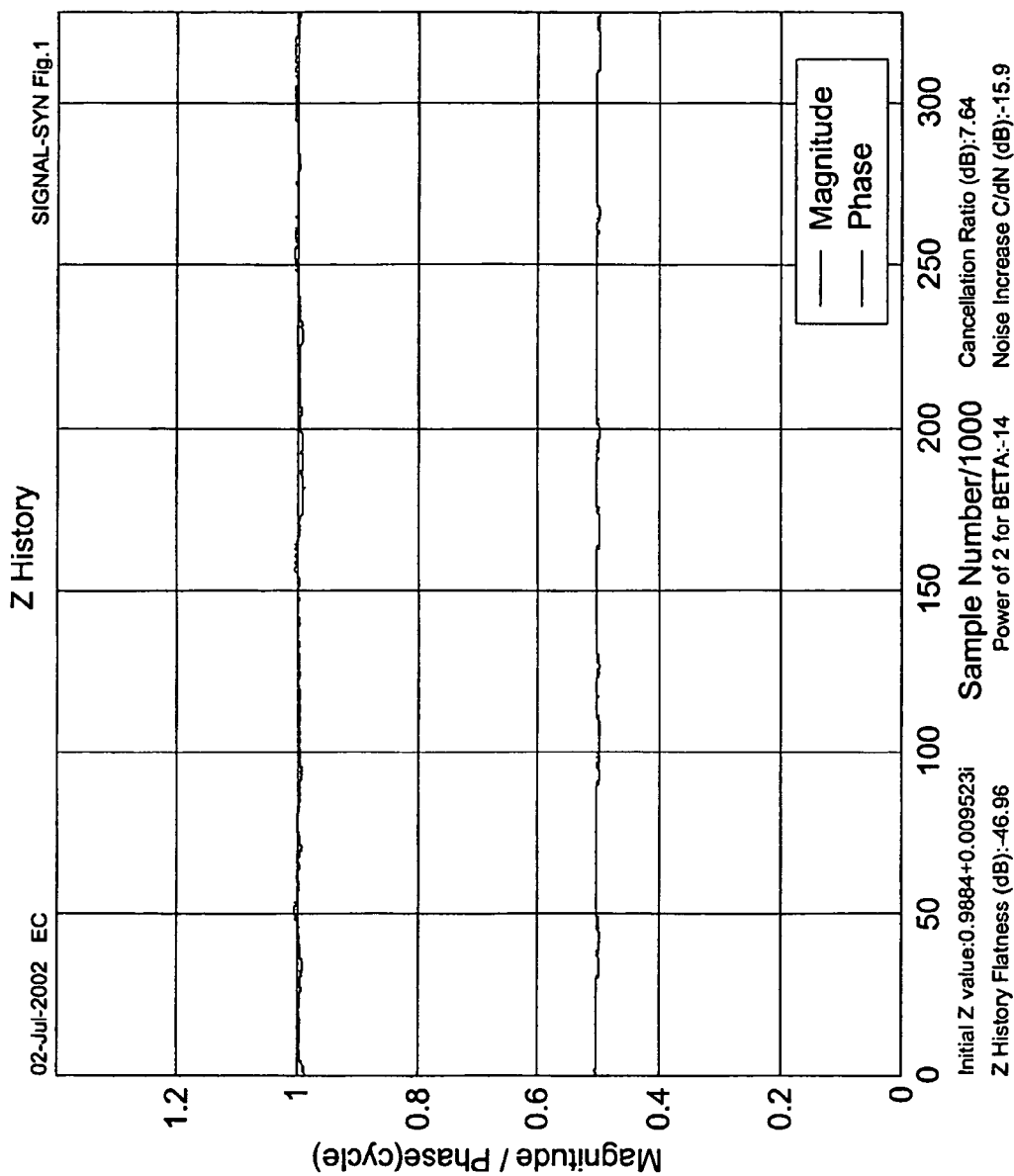
FIG. 18 is a plot of power level matching for an exemplary layer modulated signal.

FIG. 18 is a plot of upper layer signal matching calculated between received signal and reconstructed signal for an exemplary layer modulated signal. As shown, nearly constant matching coefficients (in magnitude and phase) are exhibited over 300,000 100-MHz samples, despite the presence of the lower layer signal.

Figure 19:
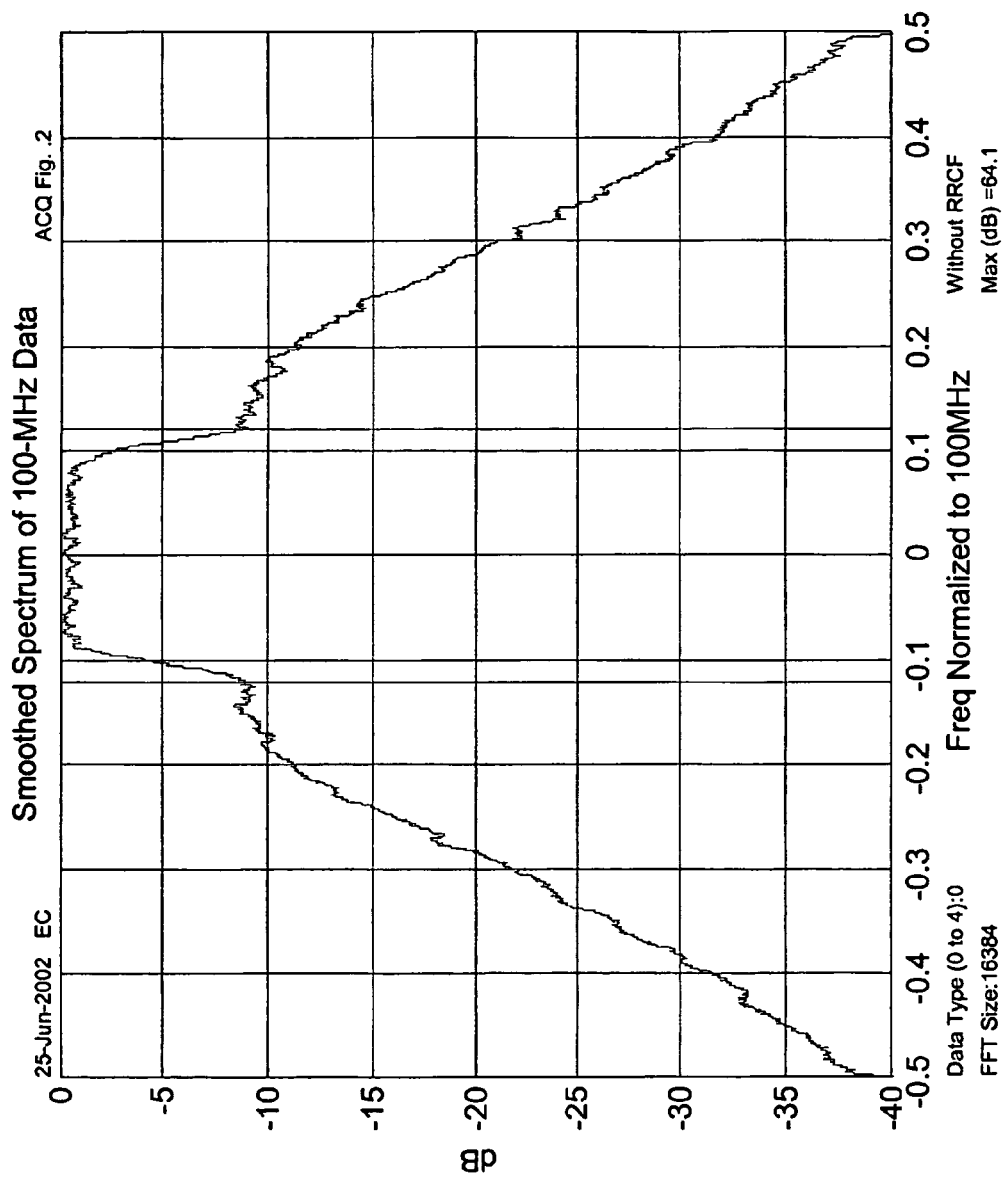
FIG. 19 is power spectrum plot of an extracted lower layer signal of an exemplary layer modulated signal.

FIG. 19 is power spectrum plot of an extracted lower layer signal of an exemplary layer modulated signal. A sampling frequency of 100 MHz is used and a display resolution is 1 MHz. The spectrum peak is scaled to 0 dB with a thermal noise floor of approximately −9 dB after canceling out the upper layer signal. The plot can be compared with the power spectrum of the composite signal shown in FIG. 14.

Figure 20A:
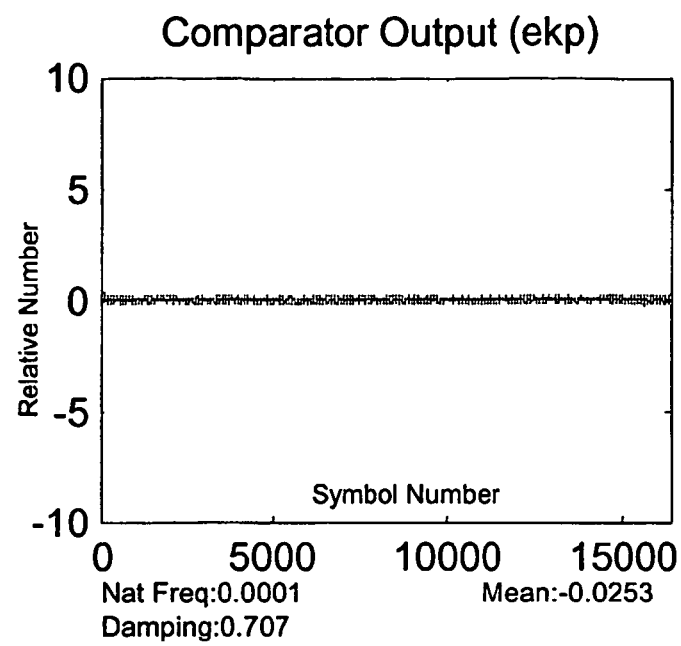
FIGS. 20A-20C are plots illustrating lower layer symbol timing recovery for an exemplary layer modulated signal.
Figure 20B:
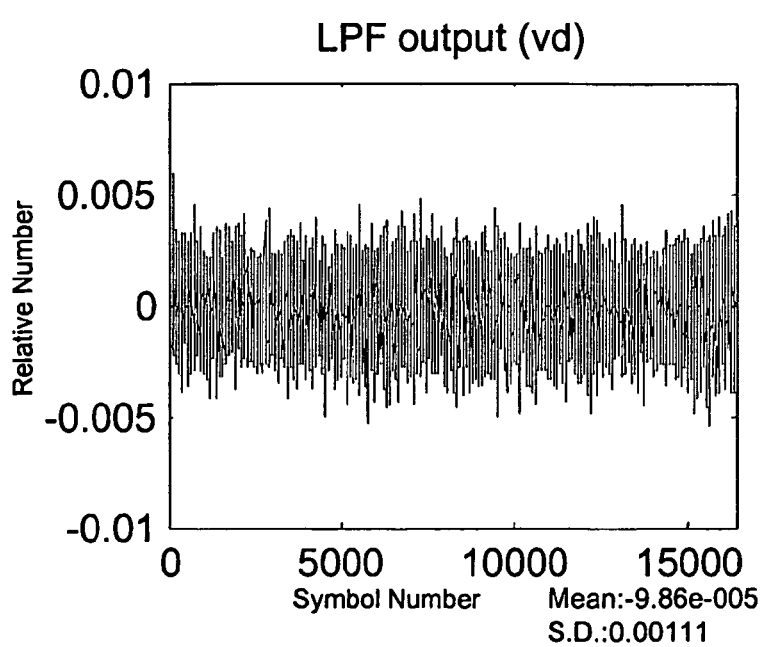
Figure 20C:
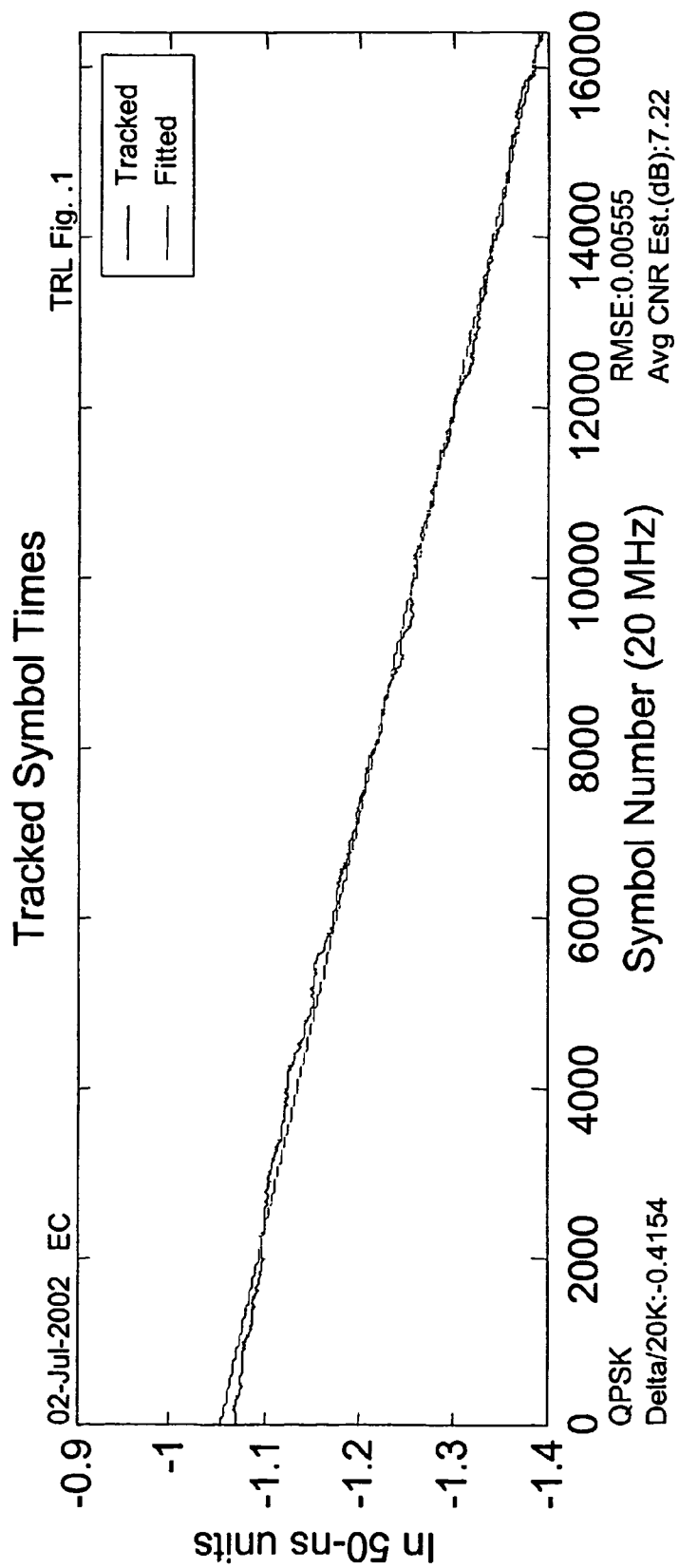

FIGS. 20A-20C are plots illustrating the extracted lower layer symbol timing recovery for an exemplary layer modulated signal. FIG. 20A is a plot of a lower layer comparator output, based on a zero-crossing method. FIG. 20B is the loop low pass filter (LPF) output; a decision-directed second order filter is applied. A nominal baud rate of 20 MHz is extracted. FIG. 20C is a plot of the tracked symbol times (indicating a delta baud rate) with a fitted curve overlaid. A small RMS error is exhibited.

Figure 20D:
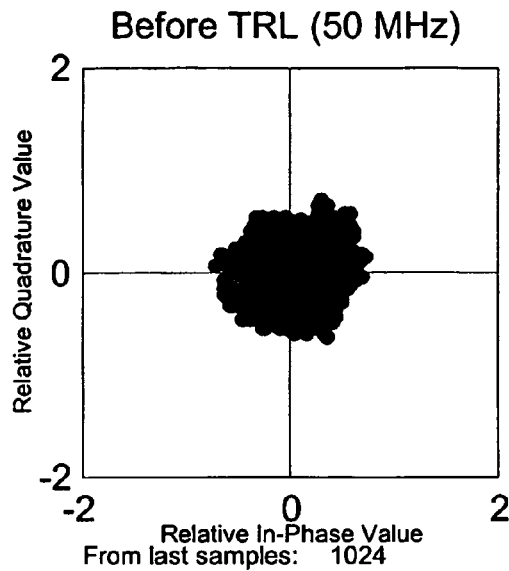
FIGS. 20D-20F are plots illustrating a lower layer symbol timing recovered signal for an exemplary layer modulated signal.
Figure 20E:
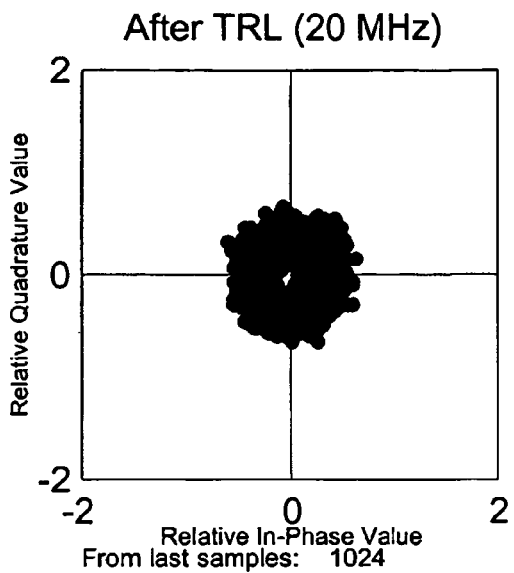
Figure 20F:
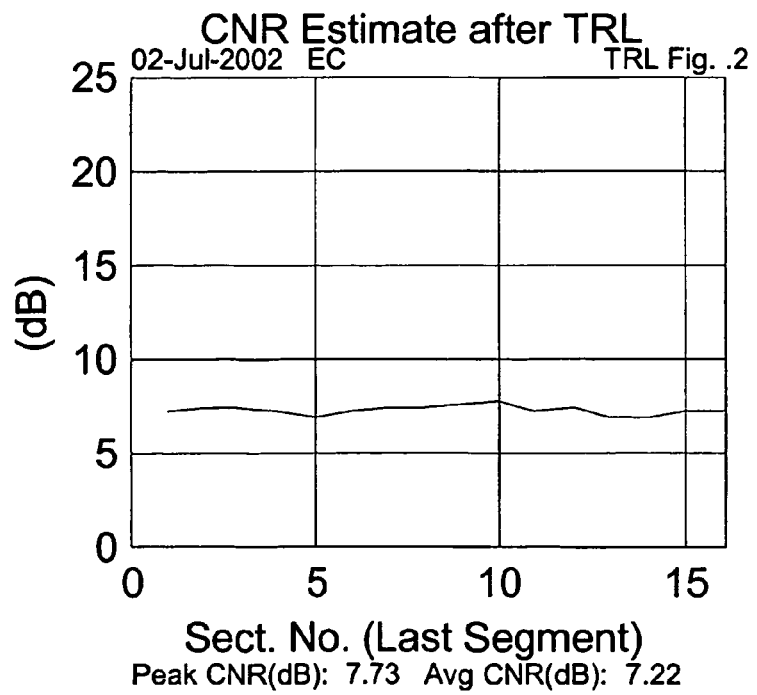

FIGS. 20D-20F are plots illustrating a lower layer symbol timing recovered signal for an exemplary layer modulated signal. FIGS. 20D and 20E illustrate respectively the upper layer signal before and after the timing recovery loop. The lower layer forms a ring in signal constellation. FIG. 20F is a plot of the CNR estimate after the timing recovery loop. The estimated output CNR of 7.22 dB compares well with the input CNR of 7.6 dB.

Figure 21A:
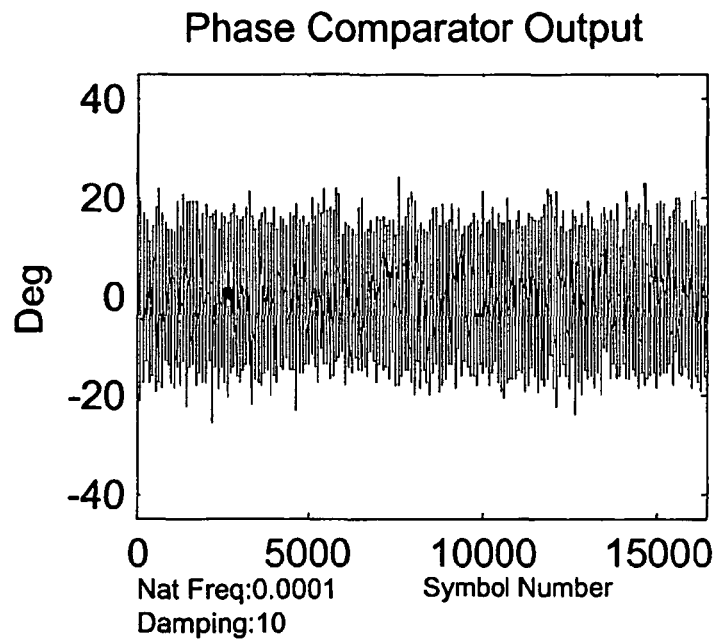
FIGS. 21A-21C are plots illustrating lower layer carrier recovery for an exemplary layer modulated signal.
Figure 21B:
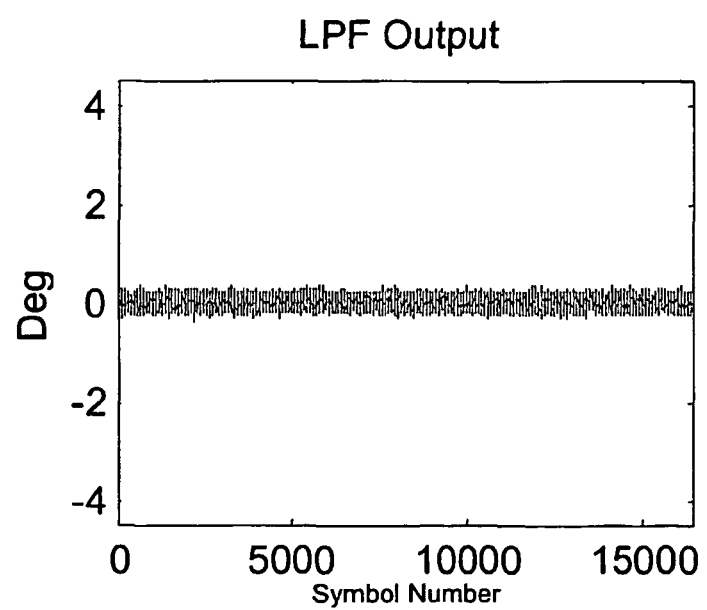
Figure 21C:
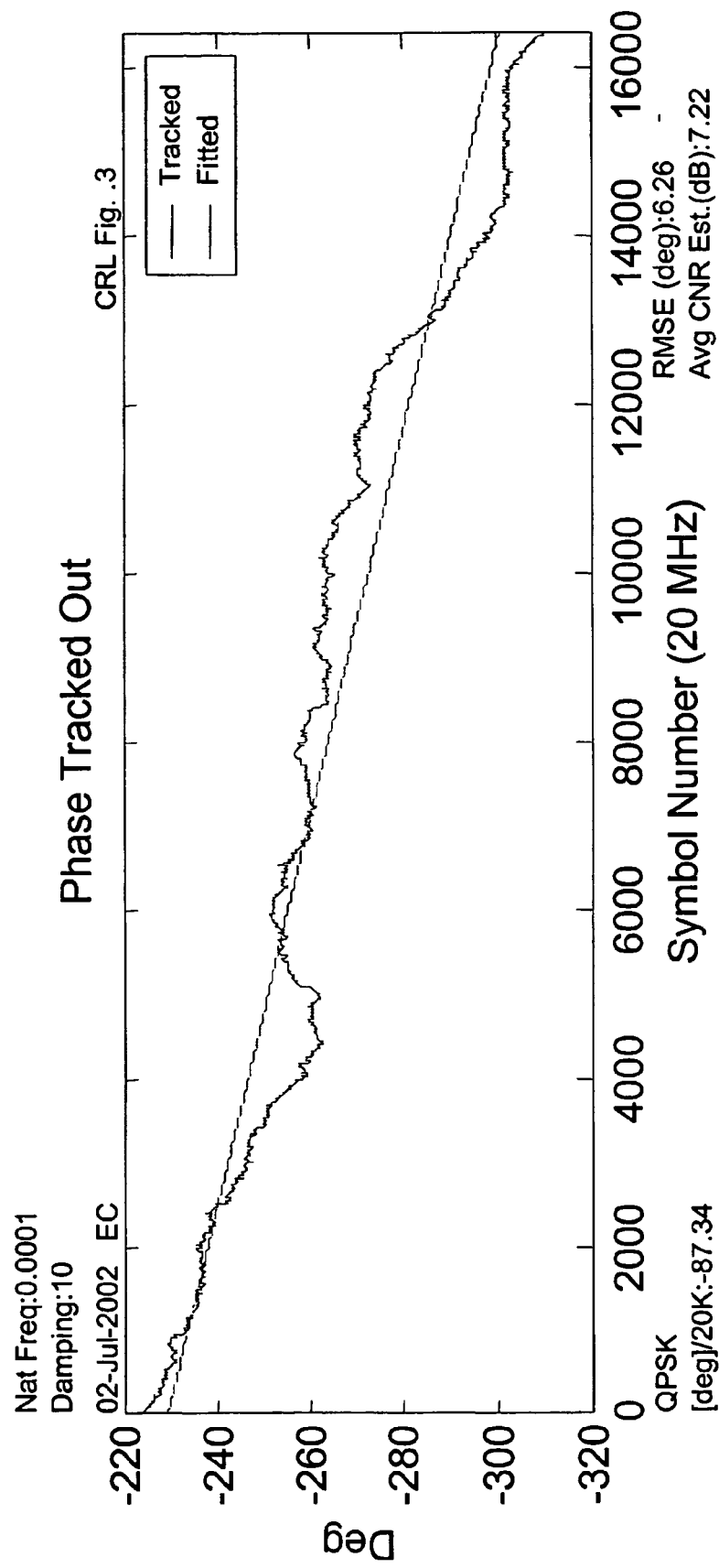

FIGS. 21A-21C are plots illustrating lower layer carrier recovery for an exemplary layer modulated signal. FIG. 21A is a plot of the lower layer phase comparator output, based on quadrature multiplication. FIG. 21B is a plot of the loop LPF output, using a decision-directed second order scheme. A nominal baud rate of 20 MHz is extracted. FIG. 21C is a plot of the phase tracked out for the simulated carrier frequency and phase noise. A nominal RMS error in phase is exhibited.

Figure 21D:
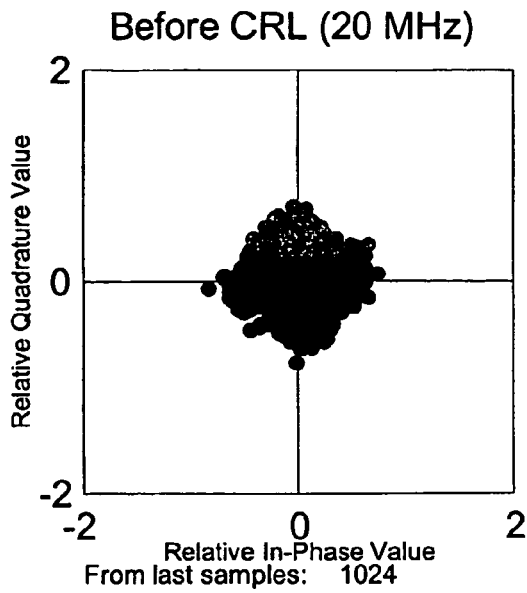
FIGS. 21D-21F are plots illustrating a lower layer carrier recovered signal for an exemplary layer modulated signal.
Figure 21E:
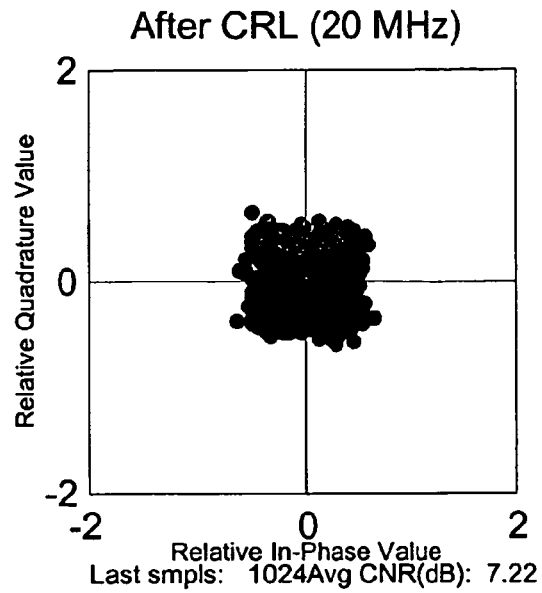
Figure 21F:
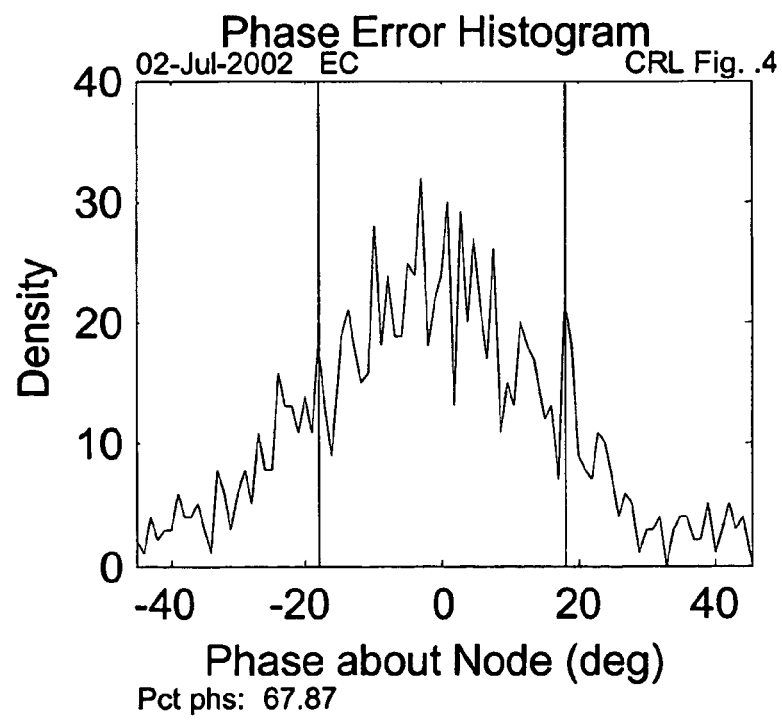

FIGS. 21D-21F are plots illustrating an lower layer carrier recovered signal for an exemplary layer modulated signal. FIG. 21D illustrates the upper layer signal before the carrier recovery loop. FIG. 21E illustrates the upper layer signal after the carrier recovery loop when the signal constellation is stabilized; the lower layer QPSK signal in the presence of noise are apparent. FIG. 21F is a histogram of the phase error about a constellation node. The estimated output CNR of 7.22 dB compares reasonably well with the input CNR of 7.6 dB.

Figure 22A:
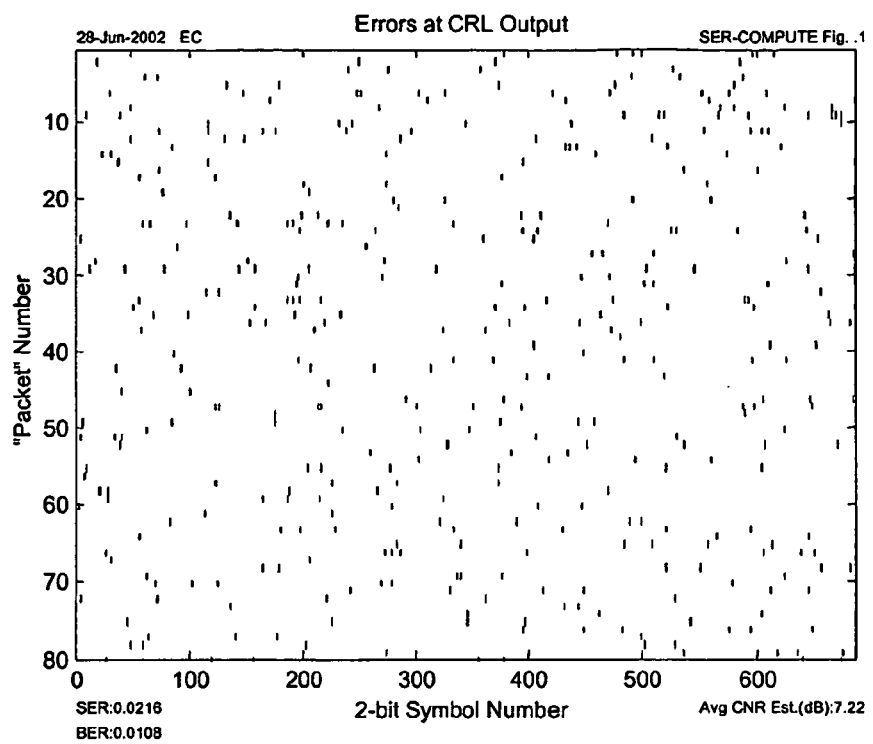
FIG. 22A is a plot of uncoded lower layer bit errors at the demodulator output for an exemplary layer modulated signal.

FIG. 22A is a plot of uncoded lower layer bit errors at the demodulator output for an exemplary layer modulated signal. The errors at the carrier recovery loop output are shown. The plot identifies 80 R-S packets of data by the "packet" number versus the two-bit symbol number. The plot reports approximately 1.1% of BER at an estimated CNR of 7.2 dB.

Figure 22B:
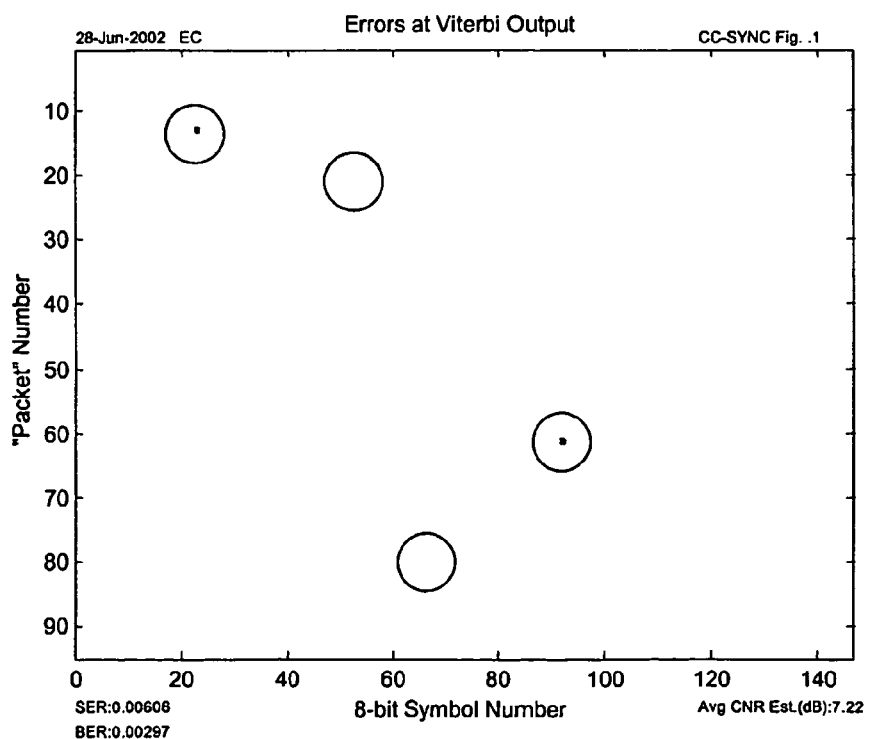
FIG. 22B is a plot of lower layer byte errors at the Viterbi decoder output for an exemplary layer modulated signal.

FIG. 22B is a plot of lower layer byte errors at the Viterbi decoder output for an exemplary layer modulated signal. The packet number is displayed versus an eight-bit symbol number, showing 95 packets worth of data. A BER of 0.297% is reported.

Figure 22C:
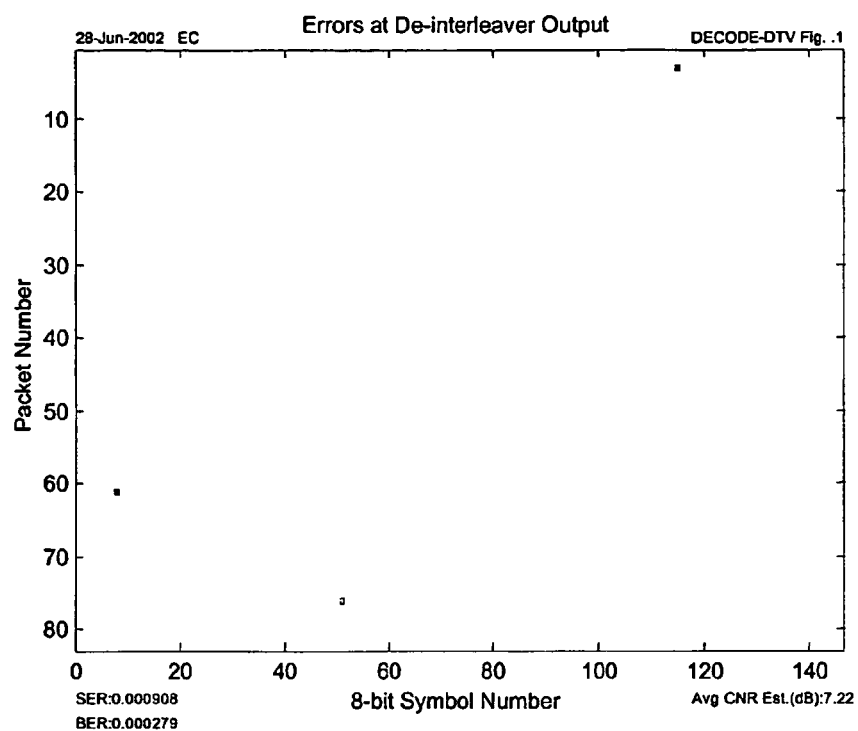
FIG. 22C is a plot of lower layer byte errors at the de-interleaver output for an exemplary layer modulated signal.

FIG. 22C is a plot of lower layer byte errors at the De-interleaver output for an exemplary layer modulated signal. The packet number is displayed versus an eight-bit symbol number, showing 83 packets worth of data.

Figure 22D:
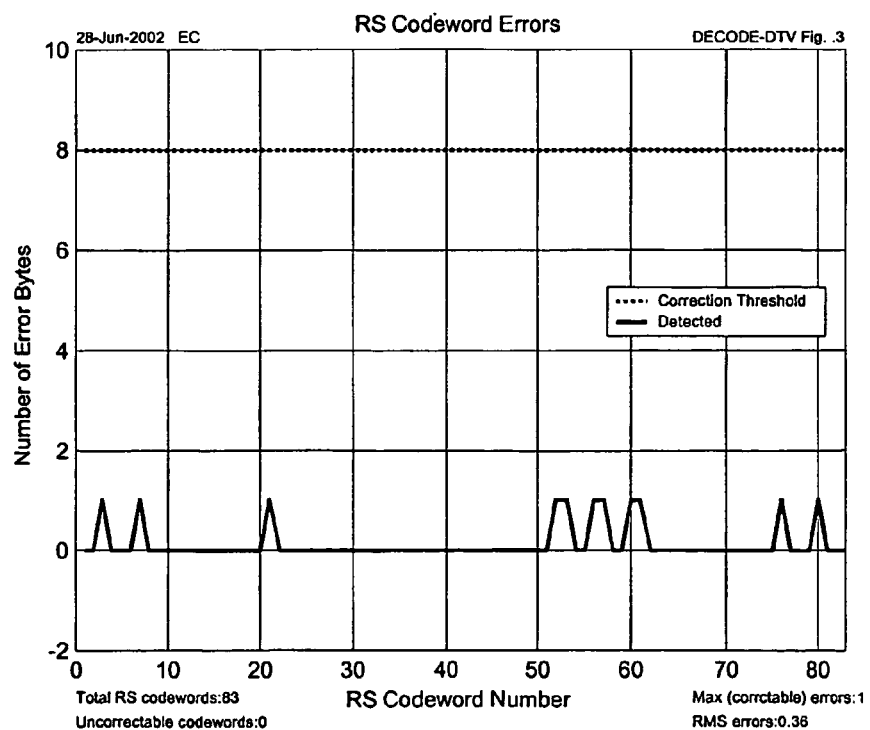
FIG. 22D is a plot of upper layer errors correctable by a Reed-Solomon decoder for an exemplary layer modulated signal.

FIG. 22D is a plot of upper layer errors correctable by a Reed-Solomon decoder for an exemplary layer modulated signal. Of the 83 packets worth of data, only 11 packets with one R-S correctable error byte each occurred, which is well below the correction threshold of eight errors. Thus, no uncorrectable errors were exhibited in 83 packets at an estimated CNR of 7.2 dB.

Figure 23A:
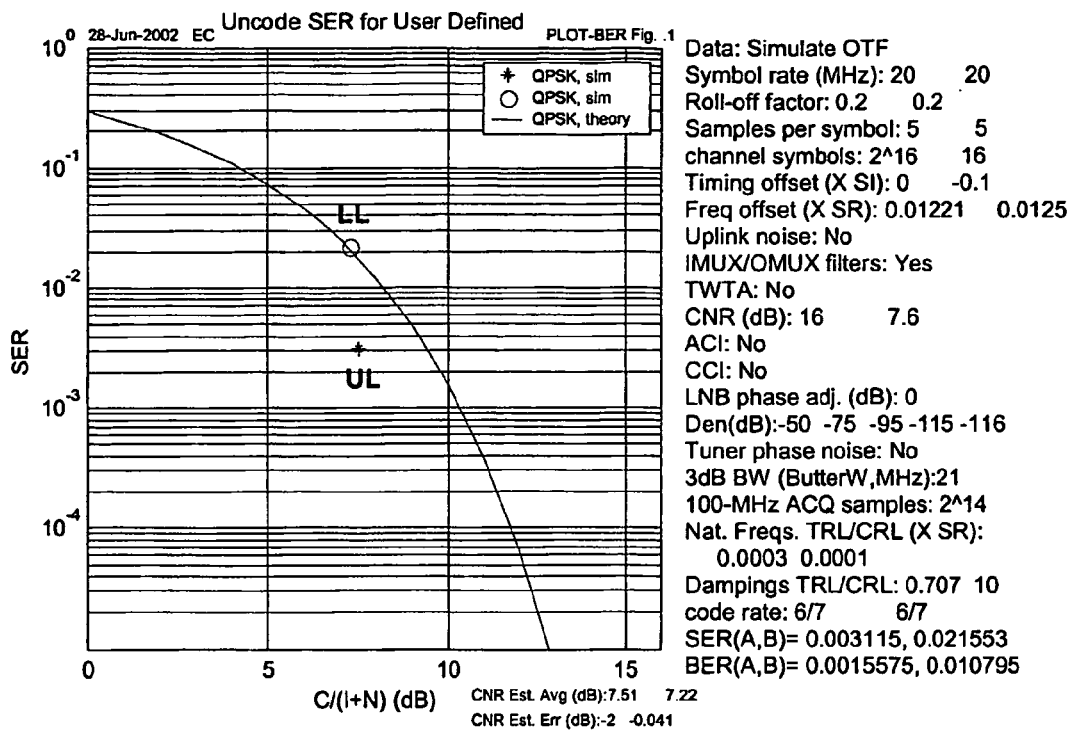
FIG. 23A is a plot of uncoded bit error rates for upper and lower layers of an exemplary layer modulated signal.

FIG. 23A is a plot of uncoded bit error rates for upper and lower layers of an exemplary layer modulated signal. The plot identifies the lower layer and upper layer simulation results relative to a theoretical result based on additive white gaussian noise (AWGN) curve, illustrating the result of 65K samples (130K bits) of data. The lower layer at the estimated CNR is shown with a BER right on the AWGN curve. The upper layer shows a BER below the curve equaling a 2.1 dB increase. Thus, QPSK interference is more benign than AWGN of the same power.

Figure 23B:
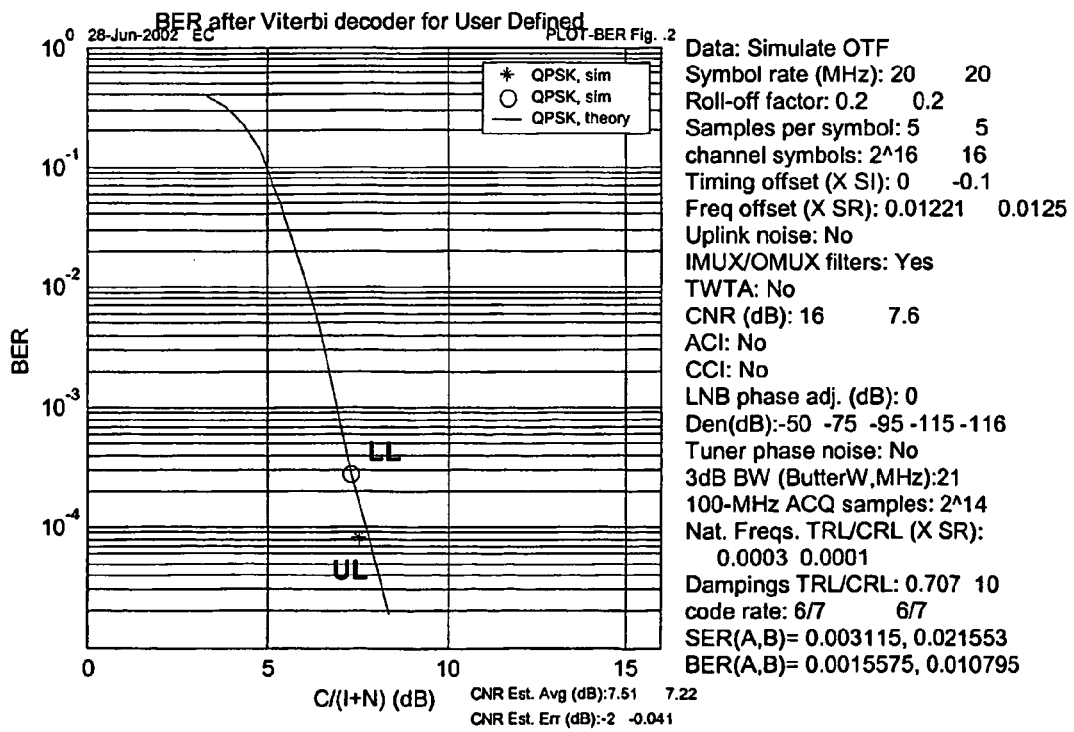
FIG. 23B is a plot of Viterbi decoder output bit error rates for upper and lower layers of an exemplary layer modulated signal.

FIG. 23B is a plot of Viterbi decoder output bit error rates for upper and lower layers of an exemplary layer modulated signal. The plot identifies the lower layer and upper layer simulation results relative to the AWGN curve, illustrating the result of 65K samples (130K bits) of data. In this case, the estimated CNR and BER for both upper and lower layers occur close to the AWGN curve.

The foregoing description including the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the invention. Since many embodiments of the invention can be made without departing from the scope of the invention, the invention resides in the claims hereinafter appended.

What is claimed is:

1. A method for simulating a layer modulated signal, comprising the steps of:
    providing an upper layer signal comprising a first bit stream modulated by a first carrier comprising modulating the first bit stream;
    providing a lower layer signal comprising a second bit stream modulated by a second carrier not coherent with the first carrier comprising modulating the second bit stream;
    adding noise to the upper layer signal;
    attenuating the lower layer signal;
    combining the upper layer signal and the attenuated lower layer signal to produce the composite layer modulated signal; and
    upconverting the composite layer modulation signal;
    wherein at least one directional coupler is used to tap the composite layer modulated signal.

2. The method of claim 1, further comprising:
    amplifying the upper layer signal; and
    amplifying the lower layer signal;
    wherein providing the upper layer signal comprises receiving the first modulated bit stream from a first satellite transponder and providing the lower layer signal comprises receiving the second modulated bit stream from a second satellite transponder.

3. The method of claim 1, wherein at least one directional coupler is used to tap the upper layer signal.

4. The method of claim 1, wherein at least one directional coupler is used to tap the attenuated lower layer signal.

5. The method of claim 1, further comprising:
    tuning the composite layer modulated signal;
    evaluating the composite layer modulated signal performance based upon the in-phase and quadrature components of the layer modulated signal.

6. A signal simulator for simulating a layer modulated signal having a an upper layer and a lower layer not coherent with the upper layer, comprising:
    a first modulator for modulating a bit stream of the upper layer according to a first carrier to produce an upper layer signal;
    a noise generator for adding noise to the upper layer signal;
    a second modulator for modulating a bit stream of the lower layer according to a second carrier not coherent with the first carrier to produce a lower layer signal;
    an attenuator for attenuating the lower layer signal; and
    a combiner for combining the noise-added upper layer signal and the attenuated lower layer signal to produce a composite layer modulated signal.

7. The signal simulator of claim 6, wherein the attenuator comprises a variable attenuator.

8. The signal simulator of claim 6, further comprising an upconverter for upconverting the composite layer modulated signal.

9. The signal simulator of claim 6, further comprising a tuner for tuning the composite layer modulated signal.

10. A method for simulating a layer modulated signal having an upper layer and a lower layer not coherent with the upper layer, comprising the steps of:
    providing an upper layer signal comprising a first bit stream modulated according to a first carrier comprising modulating the first bit stream;
    providing a lower layer signal comprising a second bit stream modulated according to a second carrier not coherent with the first carrier comprising modulating the second bit stream;
    providing the upper layer signal to a noise generator to add noise to the upper layer signal;
    attenuating the lower layer signal;
    combining the upper layer signal having the noise and the attenuated lower layer signal to produce the composite layer modulated signal;
    providing the composite layer modulated signal to an upconverter to upconvert the composite modulated signal;
    communicating the composite layer modulated signal to a tuner to extract the composite layer modulated signal; and
    evaluating the composite layer modulated signal performance based upon an in-phase component and a quadrature component of the extracted layer modulated signal.

11. The method of claim 10, further comprising amplifying the upper layer signal; and
    amplifying the lower layer signal;
    wherein providing the upper layer signal comprises receiving the first modulated bit stream from a first satellite transponder and providing the lower layer signal comprises receiving the second modulated bit stream from a second satellite transponder.

12. The method of claim 10, wherein at least one directional coupler is used to tap the upper layer signal.

13. The method of claim 10, wherein at least one directional coupler is used to tap the attenuated lower layer signal.

14. The method of claim 10, wherein at least one directional coupler is used to tap the composite layer modulated signal.

15. A signal simulator for simulating a layer modulated signal having a first modulation of an upper layer and a second modulation of a lower layer, comprising:
    a first modulator for modulating a bit stream of the upper layer according to a first carrier to produce an upper layer signal;
    a noise generator for adding noise to the upper layer signal;
    a second modulator for modulating a bit stream of the lower layer according to a second carrier not coherent with the first carrier to produce a lower layer signal;
    an attenuator for attenuating the lower layer signal;
    a combiner for combining the noise-added upper layer signal and the attenuated lower layer signal to produce the composite layer modulated signal; and
    a directional coupler, for tapping the composite layer modulated signal.

16. The signal simulator of claim 15, wherein the attenuator comprises a variable attenuator.

17. The signal simulator of claim 15, further comprising an upconverter for upconverting the composite layer modulated signal.

18. The receiver system of claim 15, further comprising a tuner for tuning the composite layer modulated signal.

* * * * *